(12) United States Patent
Gargaro, IV et al.

(10) Patent No.: US 11,919,766 B1
(45) Date of Patent: Mar. 5, 2024

(54) HYDRAULIC FLUID SPILL OVER RECEPTACLE

(71) Applicant: Northern Wholesale Supply, LLC, Lino Lakes, MN (US)

(72) Inventors: Nicholas A. Gargaro, IV, Lino Lakes, MN (US); Thomas M. Kilgriff, Scandia, MN (US)

(73) Assignee: Northern Wholesale Supply, LLC, Lino Lakes, MN (US)

( * ) Notice: Subject to any disclaimer, the term of this patent is extended or adjusted under 35 U.S.C. 154(b) by 268 days.

(21) Appl. No.: 17/347,558

(22) Filed: Jun. 14, 2021

Related U.S. Application Data

(60) Provisional application No. 63/041,057, filed on Jun. 18, 2020.

(51) Int. Cl.
| | |
|---|---|
| *B67D 7/32* | (2010.01) |
| *B65D 90/24* | (2006.01) |
| *E02D 27/38* | (2006.01) |
| *F04B 17/03* | (2006.01) |
| *F04B 23/02* | (2006.01) |
| *F16N 31/00* | (2006.01) |

(52) U.S. Cl.
CPC ........... *B67D 7/3209* (2013.01); *B65D 90/24* (2013.01); *E02D 27/38* (2013.01); *F04B 17/03* (2013.01); *F04B 23/02* (2013.01); *F16N 31/002* (2013.01); *F16N 31/004* (2013.01); *F16N 31/006* (2013.01); *Y10T 137/5762* (2015.04)

(58) Field of Classification Search
CPC .... F16N 31/006; F16N 31/004; F16N 31/002; Y10T 137/5762; F04B 23/02; E02D 27/38; B67D 7/3209; B65D 90/24
See application file for complete search history.

(56) References Cited

U.S. PATENT DOCUMENTS

| | | | | |
|---|---|---|---|---|
| 5,284,191 | A * | 2/1994 | McGarvey | B67D 7/32 141/206 |
| 10,745,195 | B1 * | 8/2020 | Murray | B65D 90/24 |
| 2013/0048630 | A1 * | 2/2013 | Zajicek | B29C 66/73921 156/60 |
| 2016/0279680 | A1 * | 9/2016 | Lutz | B08B 3/12 |
| 2017/0370525 | A1 * | 12/2017 | Hester | F16N 31/02 |
| 2021/0270155 | A1 * | 9/2021 | Hatch | F16N 31/004 |

\* cited by examiner

*Primary Examiner* — Atif H Chaudry

(57) ABSTRACT

A hydraulic fluid assembly having an electric motor, a hydraulic pump, hydraulic fluid reservoir, and a hydraulic fluid spill over receptacle engaged to and underneath the hydraulic fluid assembly for capturing spill over hydraulic fluid and directing such spill over to a periphery of the hydraulic fluid spill over receptacle, where the periphery is accessible and away from the hydraulic fluid assembly such that the spill over may be manually wiped up with a cloth rag instead of causing a slippery pontoon boat surface.

18 Claims, 14 Drawing Sheets

HYDRAULIC FLUID SPILL OVER RECEPTACLE

This application claims the benefit under 35 U.S.C. 119(e) of U.S. Provisional Patent Application No. 63/041,057 filed Jun. 18, 2020, which application is hereby incorporated by reference in its entirety into this application.

FIELD OF THE INVENTION

The present invention relates to a hydraulic fluid assembly, particularly a hydraulic fluid assembly having an electric motor, a hydraulic pump, and hydraulic fluid reservoir, and specifically to a further component of the hydraulic fluid assembly, namely, a hydraulic fluid receptacle engaged to and underneath the electric motor, hydraulic pump, and hydraulic fluid reservoir for capturing spill over hydraulic fluid when filling the hydraulic fluid reservoir or removing hydraulic hoses from the hydraulic pump, or for capturing leaking hydraulic fluid, or for capturing hydraulic fluid that is dripping from the hydraulic fluid assembly.

BACKGROUND OF THE INVENTION

Certainly there are pontoon boat races somewhere, but a pontoon boat may be primarily a social boat that carries a relatively great number of adults, teenagers, and children. A slippery surface does not mix with such a crowd out in the middle of lake. A slippery surface is a poor companion even for a sole fisherman out alone on his or her pontoon boat.

Pontoon boats have hydraulic systems. For example, some pontoon boats have large legs that engage the shoreline or the bottom of a body of water to anchor the pontoon boat or raise the pontoon boat above the surface of the water. When leaving the shoreline or sandbar, the legs are retracted. Such legs are operated hydraulically. Such is but one example of a hydraulic system. Hydraulic fluid is an oil and can create a slippery surface on a pontoon boat surface. Little is more incompatible than oil and water.

If the floor of the pontoon boat is carpeted, a puddle of hydraulic fluid may damage the carpet and be difficult to clean up. A puddle of hydraulic fluid may also damage other surfaces or undesirably run into the lake or river.

SUMMARY OF THE INVENTION

A feature of the present invention is the provision in a hydraulic fluid assembly, of the hydraulic fluid assembly having an electric motor, a hydraulic pump, and a hydraulic fluid reservoir.

Another feature of the present invention is the provision in such a hydraulic fluid assembly, of a hydraulic fluid spill over receptacle.

Another feature of the present invention is the provision in such a hydraulic fluid assembly, of a hydraulic fluid spill over receptacle engaged to the hydraulic pump and underneath a) at least a portion of a main housing of the electric motor, b) an entirety of a main body of the hydraulic pump, and c) an entirety of the hydraulic fluid reservoir.

Another feature of the present invention is the provision in such a hydraulic fluid assembly, of a hydraulic pump, the hydraulic pump having a main body, the main body having at least one fluid outlet and at least one fluid inlet.

Another feature of the present invention is the provision in such a hydraulic fluid assembly, of an electric motor engaged to the hydraulic pump for driving the pump, the electric motor having a main housing.

Another feature of the present invention is the provision in such a hydraulic fluid assembly, of a hydraulic fluid reservoir engaged to the hydraulic pump for feeding hydraulic fluid to the hydraulic pump and for receiving hydraulic fluid from the hydraulic pump.

Another feature of the present invention is the provision in such a hydraulic fluid assembly, of the hydraulic fluid spill over receptacle being engaged to the main body of the hydraulic pump.

Another feature of the present invention is the provision in such a hydraulic fluid assembly, of the hydraulic fluid spill over receptacle including a first floor portion, where at least a portion of the first floor portion is directly underneath at least a portion of the hydraulic fluid reservoir, where the first floor portion includes an uppermost surface spaced from a bottom of the hydraulic fluid reservoir such that an entirety of the first floor portion is spaced from the hydraulic fluid reservoir.

Another feature of the present invention is the provision in such a hydraulic fluid assembly, of the hydraulic fluid spill over receptacle including a second floor portion, where at least a portion of the second floor portion is directly underneath at least a portion of the main body of the hydraulic pump, and where the second floor portion is engaged to the main body of the hydraulic pump.

Another feature of the present invention is the provision in such a hydraulic fluid assembly, of the hydraulic fluid spill over receptacle including a third floor portion, where at least a portion of the third floor portion is directly underneath at least a portion of the main housing of the electric motor, and where the third floor portion includes an uppermost surface spaced from the main body of the electric motor such that an entirety of the third floor portion is spaced from the main housing of the electric motor.

Another feature of the present invention is the provision in such a hydraulic fluid assembly, of the hydraulic fluid spill over receptacle including a pair of first opposing sidewall sections having respective first top edge sections, where the hydraulic fluid reservoir is intermediate the first sidewall sections, and where the first top edge sections are at a greater altitude than a bottom of the hydraulic fluid reservoir.

Another feature of the present invention is the provision in such a hydraulic fluid assembly, of the hydraulic fluid spill over receptacle including a pair of second opposing sidewall sections having respective second top edge sections, where the main body of the hydraulic pump is intermediate the second sidewall sections, and where the second top edge sections are at a greater altitude than a bottom of the main body of the hydraulic pump.

Another feature of the present invention is the provision in such a hydraulic fluid assembly, of the hydraulic fluid spill over receptacle including a pair of third opposing sidewall sections having respective third top edge sections, where the main housing of the electric motor is intermediate the third sidewall sections, and where the third top edge sections are at a greater altitude than a bottom of the main housing of the electric motor.

Another feature of the present invention is the provision in such a hydraulic fluid assembly, of the hydraulic fluid spill over receptacle including first, second, and third bottom sections, where the first bottom section is offset vertically and horizontally from an underside of the main body of the hydraulic pump, where the second bottom section is directly underneath the underside of the main body of the hydraulic pump, where the third surface bottom section is offset vertically and horizontally from the underside of the main body of the hydraulic pump, and where the second bottom section is elevated relative to the first and third bottom sections to space the second bottom section from a surface on which the hydraulic fluid assembly is mounted.

Another feature of the present invention is the provision in such a hydraulic fluid assembly, of the hydraulic fluid spill over receptacle including a first end floor portion, where the first end floor portion includes an inner end section directly underneath the hydraulic fluid reservoir and an outer end section extending beyond an end of the hydraulic fluid reservoir such that no portion of the hydraulic fluid reservoir extends over the outer end section, and where the outer end section is disposed at an altitude lower than the inner end section such that hydraulic fluid runs downhill from the inner end section to the outer end section.

Another feature of the present invention is the provision in such a hydraulic fluid assembly, of the hydraulic fluid spill over receptacle including a first end floor portion, where the first end floor portion includes an inner end section directly underneath the hydraulic fluid reservoir and an outer end section extending beyond an end of the hydraulic fluid reservoir such that no portion of the hydraulic fluid reservoir extends over the outer end section, where the inner end section and outer end section are obliquely disposed such that hydraulic fluid on the inner end section and outer end section runs downhill from the inner end section to the outer end section and to an end wall extending upwardly from the outer end section.

Another feature of the present invention is the provision in such a hydraulic fluid assembly, of the hydraulic fluid spill over receptacle including an intermediate floor portion, where the intermediate floor portion is adjacent to at least a portion of the hydraulic fluid reservoir, where the intermediate floor portion includes a raised middle section with first and second surfaces tapering outwardly and downwardly away from each other, where the first surface tapers into a first pocket, where the second surface tapers into a second pocket, where the first pocket is disposed adjacent to a first sidewall section, where the second pocket is disposed adjacent to a second sidewall section opposing the first sidewall section, and where the hydraulic fluid runs from the raised middle section to the first and second pockets to be adjacent to the first and second sidewall sections.

Another feature of the present invention is the provision in such a hydraulic fluid assembly, of a hydraulic fluid spill over receptacle for collecting excess hydraulic fluid dripping from a hydraulic fluid assembly, where the hydraulic fluid assembly includes a hydraulic pump, an electric motor driving the hydraulic pump, and a hydraulic fluid receptacle engaged to the hydraulic pump.

Another feature of the present invention is the provision in such a hydraulic fluid assembly, of a floor and of an endless peripheral wall, where the endless peripheral wall extends upwardly from the floor, where the endless peripheral wall includes a pair of first and second sidewalls and a pair of first and second end walls between the sidewalls.

Another feature of the present invention is the provision in such a hydraulic fluid assembly, of the floor having a first end floor portion, where at least a portion of the first end floor portion is disposed directly underneath at least a portion of the hydraulic fluid reservoir, where the first end floor portion is defined in part by the first end wall and first and second sidewalls, where the first end floor portion includes an uppermost surface spaced from a bottom of the hydraulic fluid reservoir, where the uppermost surface extends transversely of the first and second sidewalls, where the first end floor portion tapers downwardly from the uppermost surface of the first end floor portion to the first end wall.

Another feature of the present invention is the provision in such a hydraulic fluid assembly, of the floor having an intermediate floor portion, where at least a portion of the intermediate floor portion is disposed directly underneath at least a portion of the hydraulic fluid reservoir, where the intermediate floor portion includes an uppermost surface spaced from a bottom of the hydraulic fluid reservoir, where the intermediate floor portion tapers downwardly from the uppermost surface of the intermediate floor portion to a first pocket defined in part by the first sidewall, and where the intermediate floor portion tapers downwardly from the uppermost surface of the intermediate floor portion to a second pocket defined in part by the second sidewall.

Another feature of the present invention is the provision in such a hydraulic fluid assembly, of the floor having an elevated portion extending between the first and second sidewalls, where the elevated portion is spaced from a plane defined by bottom portions of the hydraulic fluid receptacle that are adjacent to a surface on which the hydraulic fluid receptacle rests, and where the elevated portion is capable of being engaged to the hydraulic pump.

Another feature of the present invention is the provision in such a hydraulic fluid assembly, of the floor having a second end floor portion, where at least a portion of the second end floor portion is disposed directly underneath at least a portion of the electric motor, where the second end floor portion is defined in part by the second end wall and first and second sidewalls.

Another feature of the present invention is the provision in such a hydraulic fluid assembly, of the second end floor portion being adjacent to the elevated floor portion, of the elevated floor portion being adjacent to the intermediate floor portion, and of the intermediate floor portion being adjacent to the first end floor portion.

Another feature of the present invention is the provision in such a hydraulic fluid assembly, of the first pocket including a first pocket floor portion and the second pocket including a second pocket floor portion, where the first and second pocket floor portions are disposed at an altitude less than a lowermost portion of the first end floor portion.

Another feature of the present invention is the provision in such a hydraulic fluid assembly, of the second end floor portion being disposed at an altitude less than a lowermost portion of the first end floor portion.

Another feature of the present invention is the provision in such a hydraulic fluid assembly, of the elevated floor portion including an opening such that the receptacle may be engaged to an object by a pin connector.

Another feature of the present invention is the provision in such a hydraulic fluid assembly, of each of the first and second pockets including respective first and second openings such that the receptacle may be engaged to a second object by respective first and second pin connectors.

Another feature of the present invention is the provision in such a hydraulic fluid assembly, of the uppermost surface portion of the intermediate floor portion being disposed equidistance from the first and second sidewalls.

An advantage of the present invention is safety. Hydraulic fluid is captured before it can spread over the floor of a pontoon boat.

Another advantage of the present invention is access. The hydraulic fluid is directed to outer portions of the hydraulic fluid spill over receptacle where it can be wiped up easily with a rag.

Another advantage of the present invention is easy engagement to a hydraulic fluid assembly. One feature contributing to this advantage is a first connection, where the first connection is between the hydraulic fluid spill over receptacle and the hydraulic pump, and where the first connection is elevated relative to the floor of the pontoon boat.

Another advantage of the present invention is that the hydraulic fluid spill over receptacle may be engaged to the floor of the pontoon boat with or without a mount. One feature contributing to this advantage is a second connection, where the second connection is between the hydraulic fluid spill over receptacle and the floor of the pontoon boat.

Another advantage of the present invention is that the hydraulic fluid spill over receptacle is relatively inexpensive to manufacture.

DESCRIPTION

Figure 1:
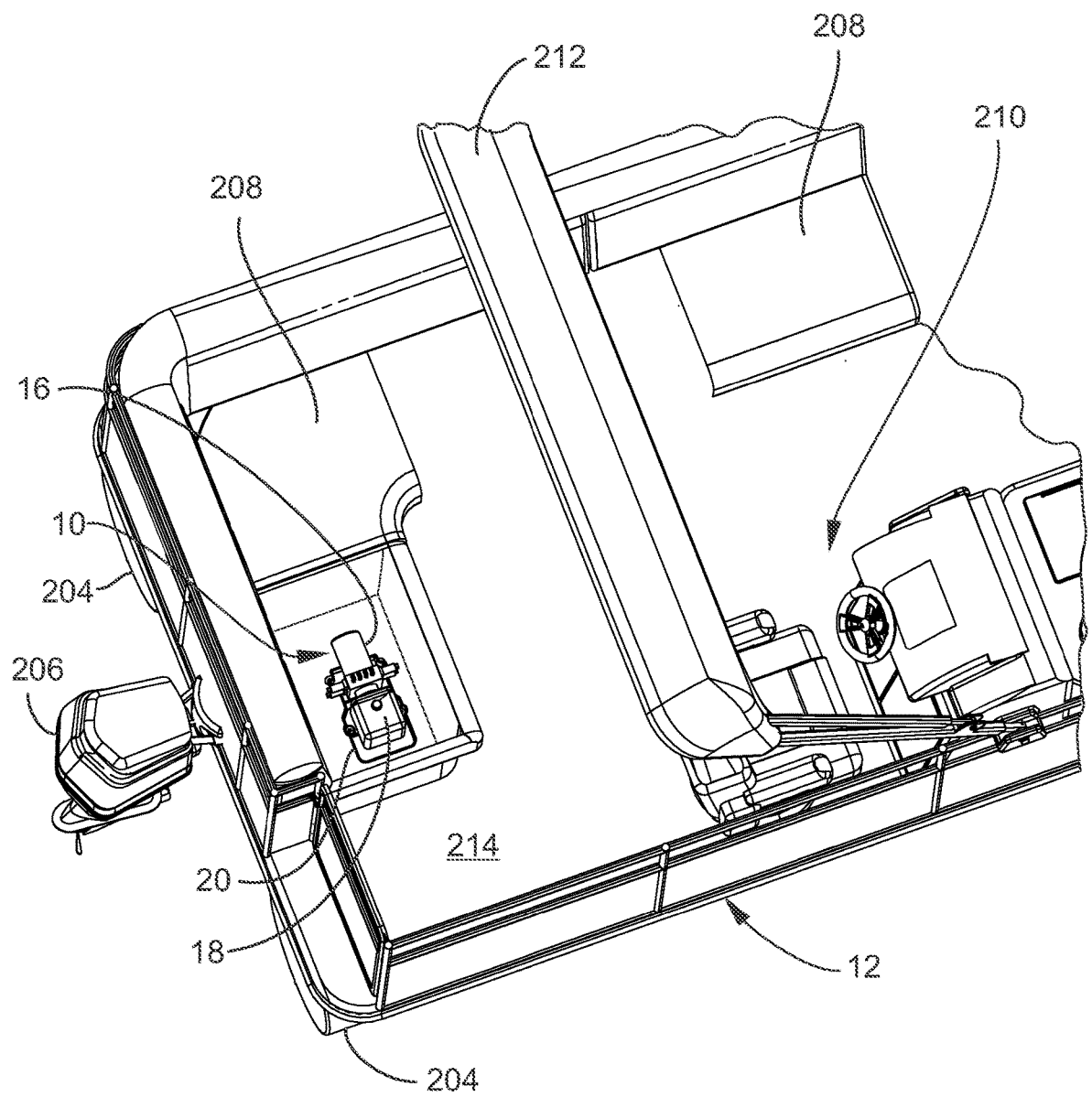
FIG. 1 is a bird's eye view of a pontoon boat having the present hydraulic fluid assembly with the hydraulic fluid spill over receptacle, where the hydraulic fluid assembly may supply hydraulic fluid to legs that support the pontoon boat relative to a surface such as a shoreline or bottom of a body of water and that raise and lower the pontoon boat relative to such surface.
Figure 2:
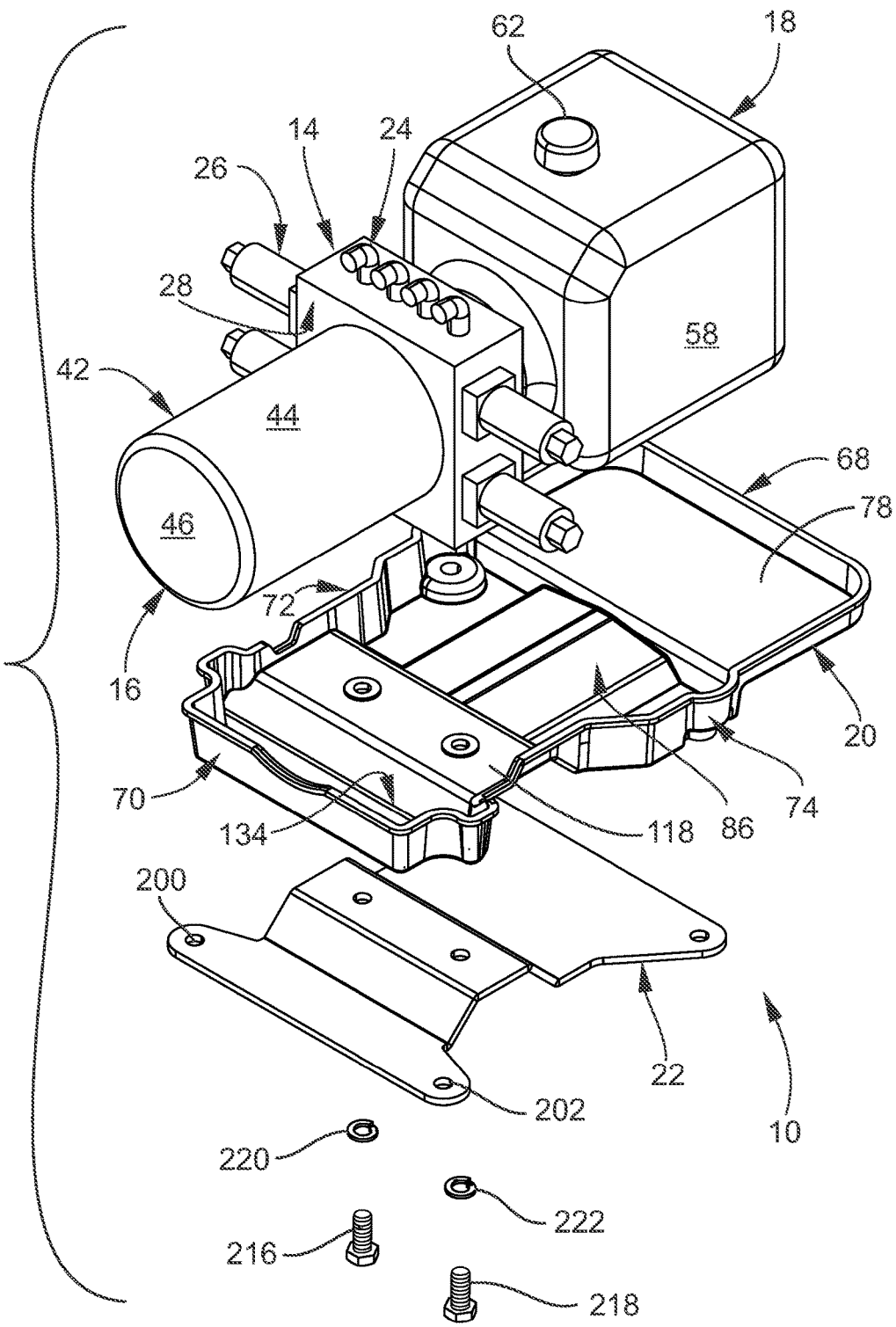
FIG. 2 is an exploded perspective view of the hydraulic oil assembly having an electric motor, hydraulic pump, hydraulic fluid reservoir, hydraulic fluid spill over receptacle, and mount.
Figure 3:
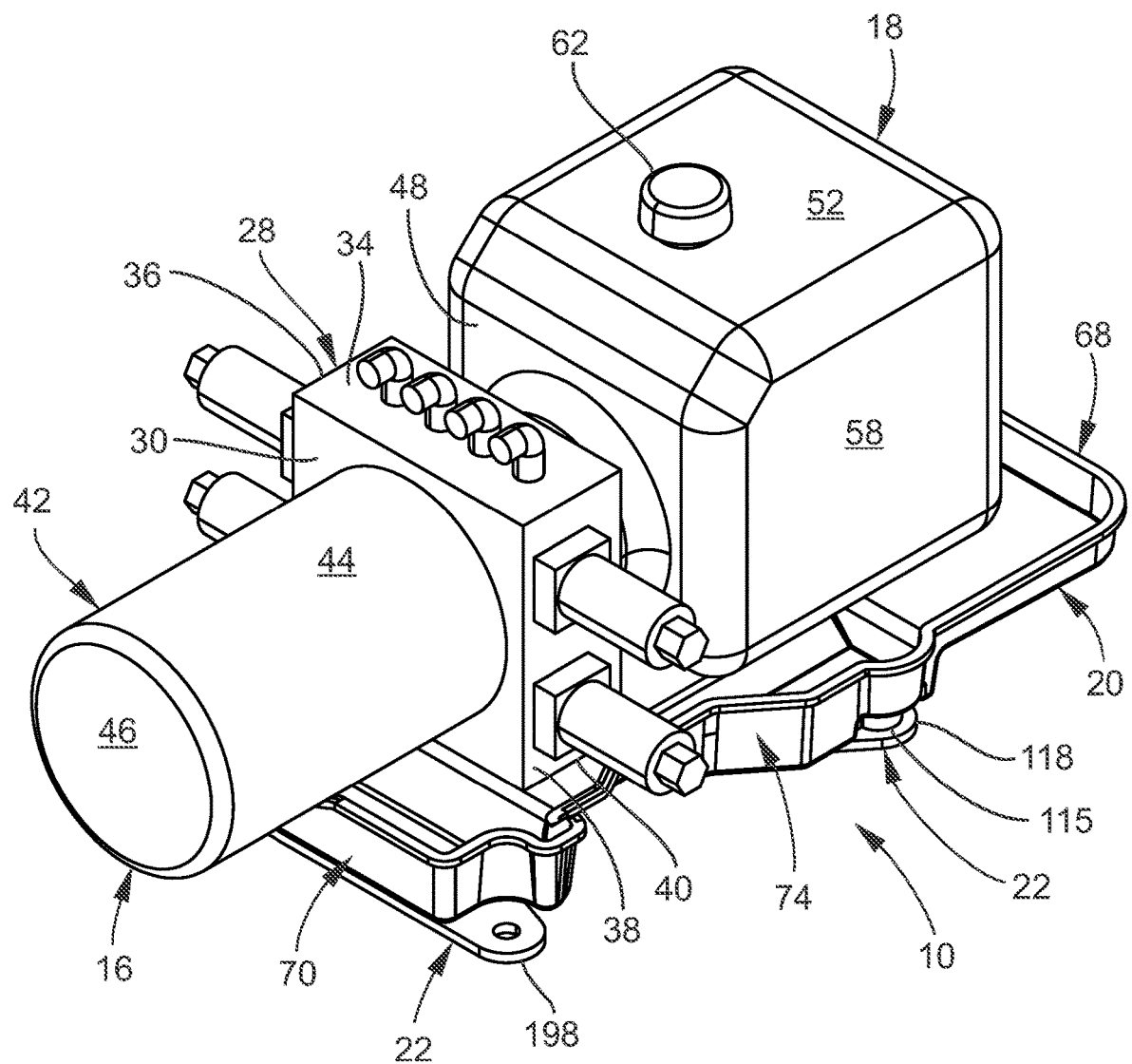
FIG. 3 is an assembled perspective view of the hydraulic fluid assembly of FIG. 2.

As shown in FIG. 1, a hydraulic fluid assembly 10 is engaged to a pontoon boat 12. As shown in FIGS. 2 and 3, the hydraulic fluid assembly 10 includes a hydraulic pump 14, electric motor 16, hydraulic fluid reservoir 18, hydraulic fluid spill over receptacle 20, and mount 22.

The hydraulic pump 14 includes a set of four fluid hose attachments 24 for at least two fluid inlets and fluid outlets and a set of four control and pressure relief valves 26. The hydraulic pump 14 further includes a main body 28 that is shaped in the parallelepiped form of a six sided box. The main body 28 of the hydraulic pump 14 includes a front face 30 adjacent to the electric motor 16, a rear face 32 adjacent to the hydraulic fluid reservoir 18, a top face 34 having the set of four fluid hose attachments 24, a pair of side faces 36, 38 having the control and pressure relief valves 26, and a bottom face 40 having connections for pins that also engages the hydraulic fluid spill over receptacle 20.

The hydraulic pump 14 is engaged to the electric motor 16. Electric motor 16 includes a main housing 42 with a cylindrical sidewall 44 and a front flat face 46. Electric motor 16 drives hydraulic pump 14. The electric motor 16 may be a 1.5 hp (horsepower), 12 volt DC (direct current), bi-rotational electric motor. If desired, the electric motor may be a 2.5 hp (horsepower), 12 volt DC (direct current), bi-rotational electric motor. The electric motor may have another horsepower if desired. Other types and kinds of electric motors may be used as well.

The hydraulic fluid reservoir 18 is engaged to the hydraulic pump 14 opposite of the electric motor 16. The reservoir 18 is generally box shaped so as to include a front face 48, rear face 50, top face 52, bottom face 54, a first side face 56, and a second side face 58. The bottom face 54 or bottom side 54 is flat. The reservoir 18 includes an opening in the top side 52 that is covered by a cap 32. The reservoir 18 includes a neck 60 extending forwardly from the front face 48 that engages the rear face 32 of the main body 28 of the hydraulic pump 14. The top opening covered by cap 62 is used for filing the reservoir 18 with hydraulic fluid.

The hydraulic pump main housing 28 may be the sole support for the electric motor 16 and the hydraulic reservoir 18, full of hydraulic fluid, relative to a surface to which the main housing 28 is engaged such that the electric motor 16 and hydraulic reservoir 18 require no other supports.

Figure 9:
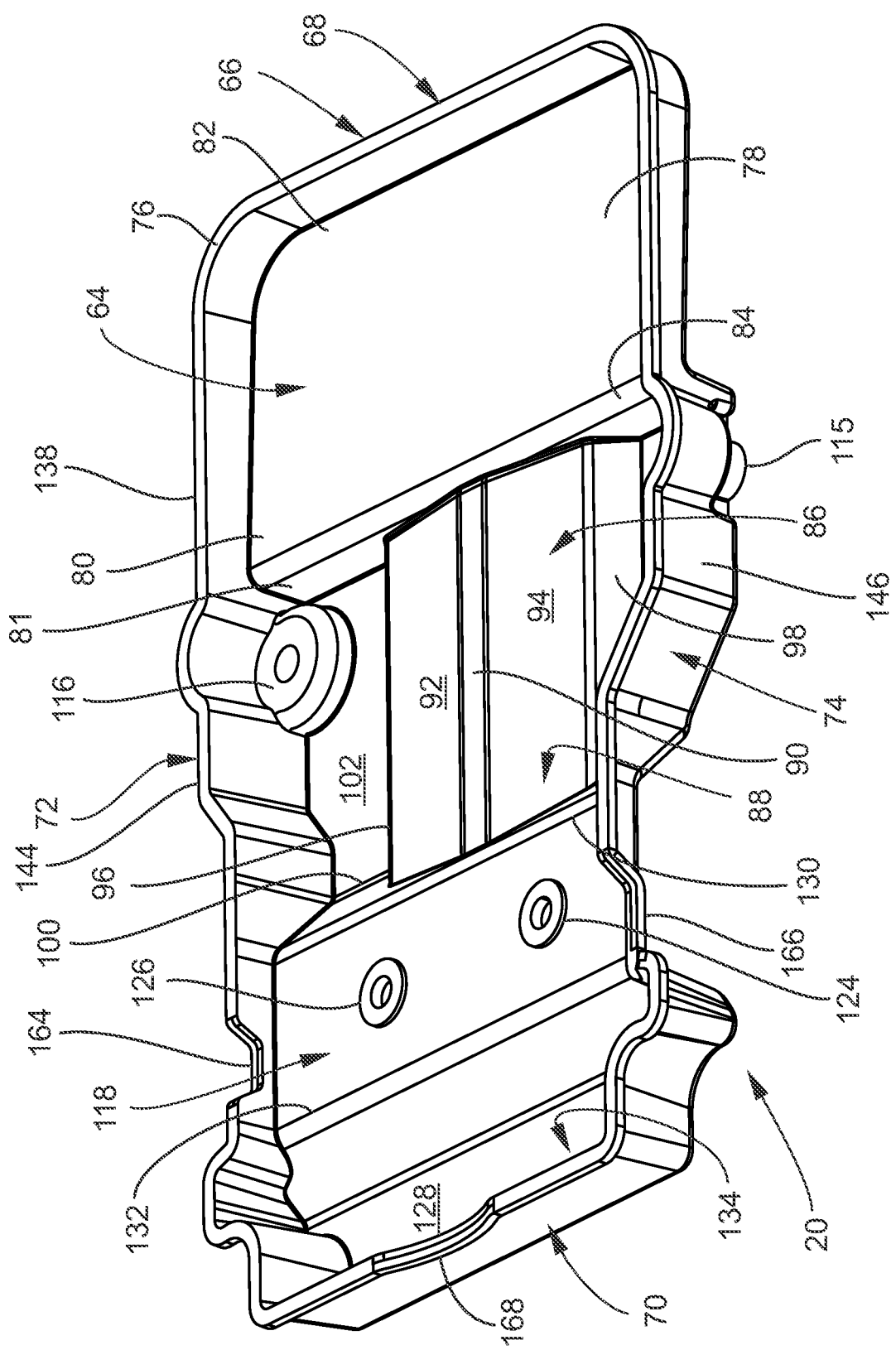
FIG. 9 is a perspective view of the hydraulic fluid spill over receptacle of FIG. 2.

As shown in FIG. 9, the hydraulic fluid spill over receptacle 20 includes an multi-part floor 64 bordered by a peripheral endless wall 66. Wall 66 includes a first end wall portion 68, a second end wall portion 70, a first sidewall portion 72, and a second sidewall portion 74. First sidewall portion 72 runs to and between the first and second end wall portions 68, 70. Second sidewall portion 74 runs to and between the first and second end wall portions 68, 70. First and second end wall portions 68, 70 oppose each other. First and second sidewall portions 72, 74 oppose each other. The peripheral wall 66, and its portions 68, 70, 72, 74, rise upwardly from floor 64. Wall 66 includes an endless top edge 76. Endless top edge 76 at any point or portion has a greater elevation or altitude than any point or portion of the floor 64.

Multi-part floor 64 includes a first floor portion 78 that may also be referred to as rear end floor portion 78 or first end floor portion 78. At least a section of the first floor portion 78 is directly underneath of at least a portion of the hydraulic fluid reservoir 18. The first floor portion 78 includes an uppermost surface or section 80 spaced from the bottom face 54 of the hydraulic fluid reservoir 18. Uppermost surface or section 80 traverses the floor 64 from sidewall 72 to sidewall 74. Uppermost surface or section 80 is adjacent to an upright floor wall section 81A that extends from sidewall 72 and to an upright floor wall section 81B that extends inwardly from sidewall 74, as shown in FIG. 12C. A junction 84 traverses the floor 64 from sidewall 72 to sidewall 74 and is a junction between upright wall sections 81A and 81B and uppermost floor section 80. First floor portion 78 is oblique or tapering and uppermost section 80 also is oblique or tapering. First floor portion 78 tapers from uppermost section 80 to first end wall 68 such that spill over hydraulic fluid can flow to the first end wall 68 that is disposed beyond the hydraulic fluid reservoir 18 such that spill over hydraulic fluid that flows down the first floor portion 78 is easily wiped up with a rag at the accessible section of the first floor portion 78 that is adjacent to the first end wall 68. An entirety of the first floor portion 78 is spaced from the hydraulic fluid reservoir 18. In other words, first floor portion 78 may be referred to as a first end floor portion 78 or rear end floor portion 78 having an uppermost section or inner end section 80 and an outer end section 82. A middle portion of inner end section 80 is disposed directly underneath the hydraulic fluid reservoir 18 and outer end section 82 extends beyond an end of the hydraulic fluid reservoir 18 such that no portion of the hydraulic fluid reservoir 18 extends over the outer end section 82. The outer end section 82 has an elevation or altitude lower than the inner end section 80 such that hydraulic fluid runs downhill from the inner end section 80 to the outer end section 82 adjacent to first end wall 68. Each of the inner end section 80 and outer end section 82 is obliquely disposed. Inner end section 80 and outer end section 82 in combination define a plane. Junction 84 may be rounded or have a radius such that junction 84 is a smooth transition between upright inner wall sections 81A and 81B and inner end section 80.

Hydraulic fluid spill over receptacle 20 includes an intermediate floor portion 86 that is adjacent to at least a portion of the hydraulic fluid reservoir 18. The intermediate floor portion 86 is spaced from the hydraulic fluid reservoir 18. The intermediate floor portion 86 traverses the floor 64 from first sidewall 72 to second sidewall 74. The intermediate floor portion 86 includes a raised middle section 88 that runs longitudinally in the direction of to and from the end walls 68, 70. Raised middle section 88 includes uppermost flat section 90, tapering section 92 tapering downwardly and outwardly from uppermost section 90 toward first sidewall 72, tapering section 94 tapering downwardly and outwardly from uppermost section 90 toward second sidewall 74, tapering section 96 tapering downwardly and outwardly from tapering section 92, and tapering section 98 tapering downwardly and outwardly from tapering section 94. Tapering sections 96, 98 have a greater slope than tapering sections 92, 94. Raised middle section 88, its uppermost flat section 90 and its tapering sections 92, 93, 96, 98, extend longitudinally to and between inner wall sections 81A, 81B and another inner wall 100. Raised middle section 88 and its lower tapering sections 96, 98 terminate at pocket floor portions 102, 104. Pocket 106 is formed by pocket floor portion 102, first sidewall 72, inner wall section 81A, inner wall 100, and tapering section 96. Pocket 108 is formed by pocket floor portion 104, second sidewall 74, inner wall section 81B, inner wall 100, and tapering section 98. Hydraulic fluid spill over drains into pockets 106, 108. Hydraulic fluid spill over may run down tapering sections 94, 98 to pocket floor portion 104 where it may be wiped up with a rag. Hydraulic fluid spill over may run down tapering sections 92, 96 to pocket floor portion 102 where it may be wiped up with a rag. Pocket floor portions 102, 104 are disposed at accessible locations away from the hydraulic fluid reservoir 18.

Intermediate floor portion 86 includes opening 110 in pocket floor portion 104 and a related boss and grommet combination 114 for receiving a pin connector that engages a surface such as a floor of a pontoon boat for engaging the receptacle 20 and hydraulic fluid assembly 10 as a whole on such surface. Intermediate floor portion 86 includes opening 112 in pocket floor portion 102 and a related boss and grommet combination 116 for receiving a pin connector that engages a surface such as a floor of a pontoon boat for engaging the receptacle 20 and hydraulic fluid assembly 10 as a whole on such surface. Such pin connectors may have a head that rests on the grommet portion of the combinations 114, 116, which grommet portion in turn brings pressure to bear on the boss portion of the combinations 114, 116, which boss portion may be integral with the receptacle 20. The bottom side of the hydraulic fluid spill over receptacle 20 may have respective integral bosses 115, 117 or boss like portions that vertically oppose the respective boss and grommet combinations 114, 116.

Figure 11A:
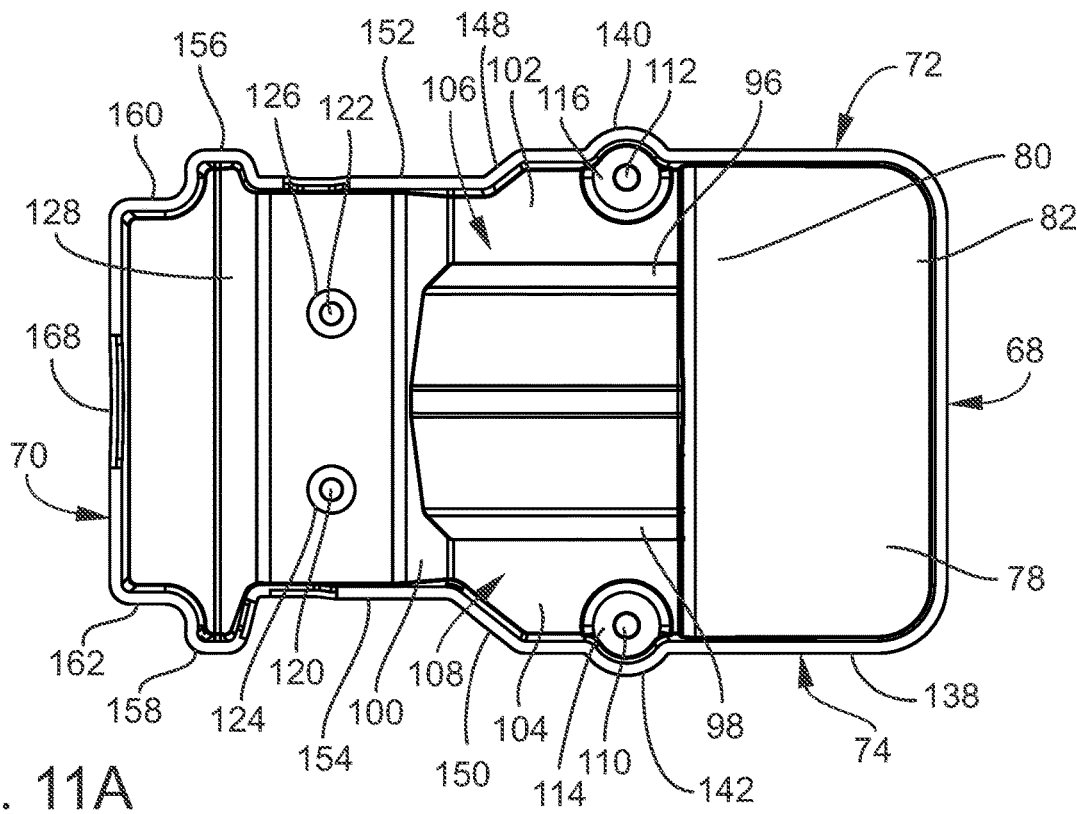
FIG. 11A is a top view of the hydraulic fluid spill over receptacle of FIG. 9.
Figure 11B:
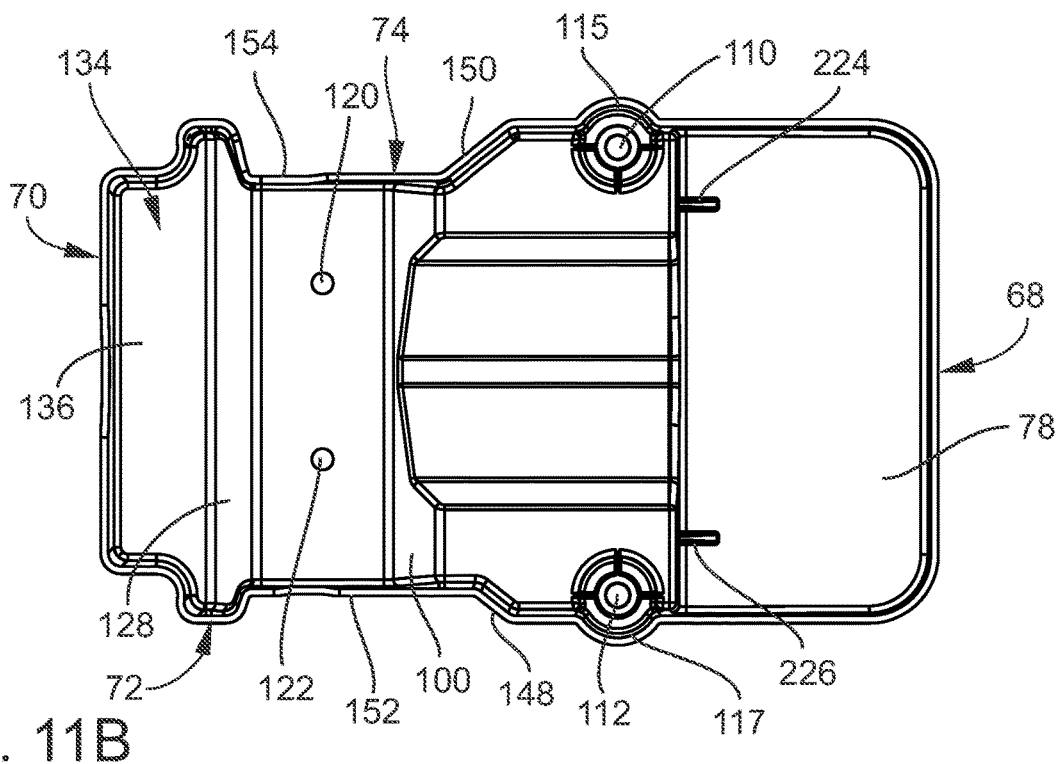
FIG. 11B is a bottom view of the hydraulic fluid spill over receptacle of FIG. 9.

Hydraulic fluid spill over receptacle 20 includes a second floor portion 118 that laterally traverses the floor 64 between first and second sidewalls 72, 74. Floor portion 118 includes the greatest elevation or altitude of the various parts or portions of the floor 64. At least a portion of second floor portion 118 is directly underneath of at least a portion of the main body 28 of the hydraulic pump 14. The second floor portion 118 is engaged to the main body 28 of the hydraulic pump 14 by pin connectors 119 (shown in FIG. 8) engaging openings 120, 122 that are shown in FIGS. 11A and 11B. Surrounding the openings 120, 122 are integral bosses 124, 126. Second floor portion 118 is flat and defines a plane. Second floor portion 118 extends longitudinally between inner end wall 100 and another inner wall 128. A curved or radius junction 130 extends laterally between second floor portion 118 and inner wall 100. A curved or radius junction 132 extends laterally between second floor portion 118 and inner wall 128. Inner wall 100 tapers downwardly and away from second floor portion 118 such that hydraulic spill over fluid drains into pockets 106, 108. Inner wall 128 tapers downwardly and away from second floor portion 118 such that hydraulic spill over fluid drains into a third floor portion 134.

Third floor portion 134 may be defined to be a combination of tapering inner wall 128 and flat surface 136. Flat surface 136 is disposed at the lowermost portion of second end wall 70, the lowermost portions of the sidewalls 72, 74, and the lowermost portion of tapering inner wall 128 such that flat surface 136 defines a plane. At least a portion of the third floor portion 134 is directly underneath at least a portion of the main housing 42 of the electric motor 16.

Peripheral endless wall 66 includes a U-shaped wall section 138 that defines the first floor portion 78. The height of the U-shaped wall section 138 increases as the wall section 138 extends from the junction 84 to the first end wall 68. The height of the U-shaped wall section 138 is greatest at the first end wall 68. U-shaped wall section 138 includes the entire first end wall 68 and portions of the first and second sidewalls 72, 74.

Peripheral endless wall 66 includes first and second U-shaped wall sections 140, 142 that are wall portions of sidewalls 72, 74. U-shaped sections 140, 142 are adjacent to the grommet and boss combinations 116, 114. U-shaped sections 140, 142 oppose each other.

Peripheral endless wall 66 includes longitudinally extending wall sections 144, 146 that are wall portions of sidewalls 72, 74. Wall sections 144, 146 oppose each other.

Peripheral endless wall 66 includes obliquely extending wall sections 148, 150 that are portions of sidewalls 72, 74. Obliquely extending wall sections 148, 150 oppose each other. Wall sections 148, 150 are oblique relative to longitudinally running wall sections 144, 146 and to a longitudinal central axis of the receptacle 20.

Peripheral endless wall 66 includes longitudinally extending wall sections 152, 154 that respectively run into U-shaped wall sections 156, 158 that respectively run into longitudinally extending wall sections 160, 162 that run into second end wall 70. Longitudinal wall sections 152, 154 oppose each other and are portions of respective sidewalls 72, 74. U-shaped wall sections 156, 158 oppose each other oppose each other and are portions of respective sidewalls 72, 74. Longitudinal wall sections 152, 154 oppose each other oppose each other and are portions of respective sidewalls 72, 74. Longitudinal wall sections 152, 154 have U-shaped cut-outs 164, 166 for the control and pressure relief valves 26 and/or for tools for engaging the control and pressure relief valves 26. The bottom portions of the cut-outs 164, 166 are disposed at a greater elevation or altitude than second floor portion 118. Second end wall includes a cut-out 168 that is spaced from and adjacent to the main housing 42 of the electric motor 16. Cut-out 168 is centrally disposed in second end wall 70.

Figure 10:
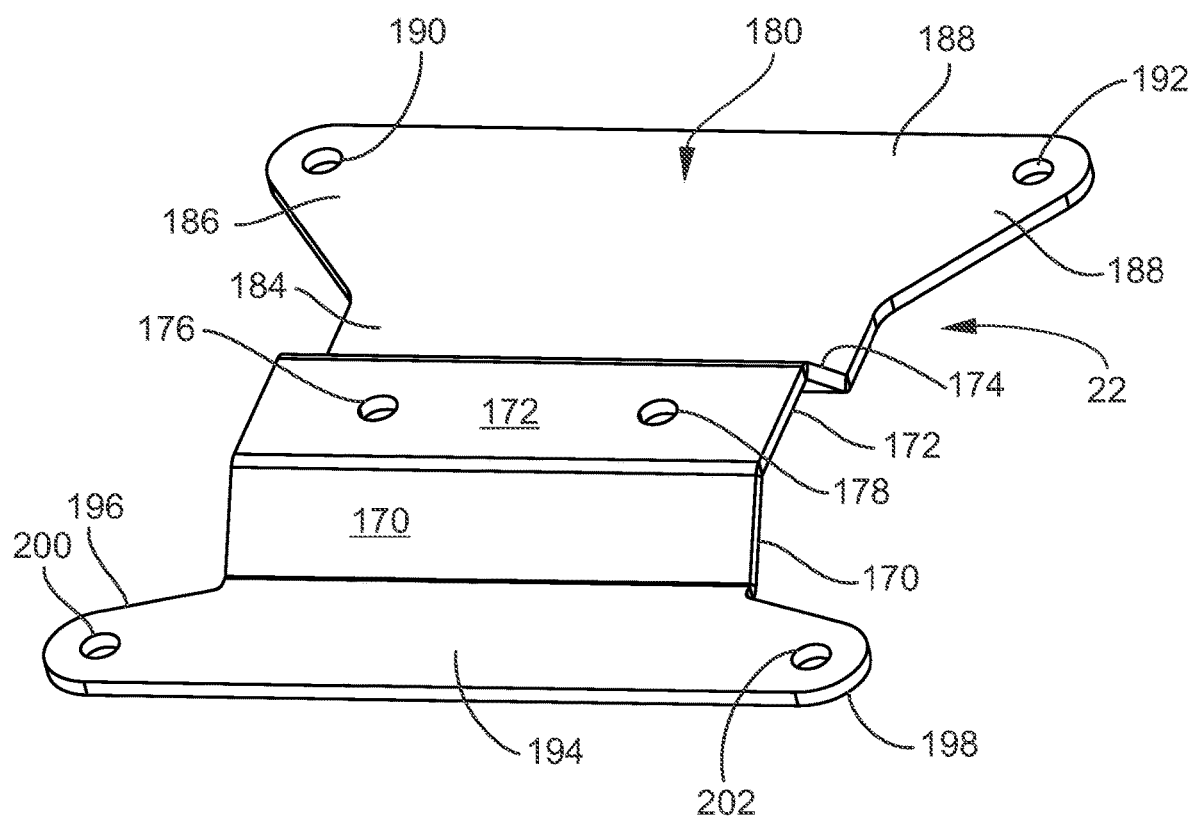
FIG. 10 is a perspective view of the mount of FIG. 2.

Mount 22 is shown in FIG. 10. Mount 22 is optional. Mount 22 is a support for the receptacle 20 that may be formed of plastic or metal. Mount 22 may be formed of plastic or metal. Mount 22 includes three plate sections 170, 172, 174 that are adjacent to, respectively, tapering inner wall 128, second floor support 118, and tapering inner wall 100. Plate section 172 includes pin connector holes 176, 178 that align with respective pin connector holes 122, 120 of receptacle 20.

Mount 22 further includes a flat plate section 180 that includes the combination of a trapezoidal section 182 and rectangular section 184. Trapezoidal section 182 includes a pair of ears 186, 188, each of which includes a respective hole 190, 192. Holes 190, 192 align respectively with boss and grommet combinations 116, 114 and their respective holes 112, 110. Pin connectors engaging holes 112, 110 and 190, 192 engage the surface, such as a pontoon boat deck, on which the hydraulic fluid housing 10 is mounted. Plate section 180 is adjacent to pocket floor sections 102, 104.

Mount 22 further includes a plate section 194 opposite of plate section 180. Plate section 194 includes a pair of ears 196, 198 having respective holes 200, 202. Plate section 194 is adjacent to third floor section 136. Ears 196, 198 extend outwardly beyond third floor section 136 such that holes 200, 202 are accessible for pin connectors for engaging the mount 22 on a surface, such as a pontoon boat deck or floor, on which the hydraulic fluid housing 10 is mounted.

Among other features of a pontoon boat 12, FIG. 1 shows floats 204, an outboard engine 206, seating 208 for passengers, a piloting area 210, an extendable and retractable canopy 212, and decking 214 or a floor 214. FIG. 1 also shows the hydraulic fluid assembly 10, including the electric motor 16, reservoir 18, and receptacle or tray 20.

FIG. 2 shows an exploded view of the hydraulic fluid assembly 10 and its hydraulic pump 14, electric motor 16, reservoir 18, hydraulic fluid spill over receptacle 20, and mount 22. FIG. 2 further shows pin connectors 216, 218 for engaging respective pin holes 200, 202 from below the decking 214.

FIG. 3 shows an assembled view of the hydraulic fluid assembly 10 and its hydraulic pump 14, electric motor 16, reservoir 18, hydraulic fluid spill over receptacle 20, and mount 22. FIG. 3 further shows the exposure of ear 198. Opposing ear 196 is likewise exposed such that pin connectors 216, 218 do not engage the hydraulic fluid spill over receptacle 20 and such that pin connectors 216, 218 are accessible. To engage the hydraulic fluid assembly 10 to the floor, threaded nuts may be used.

Figure 4:
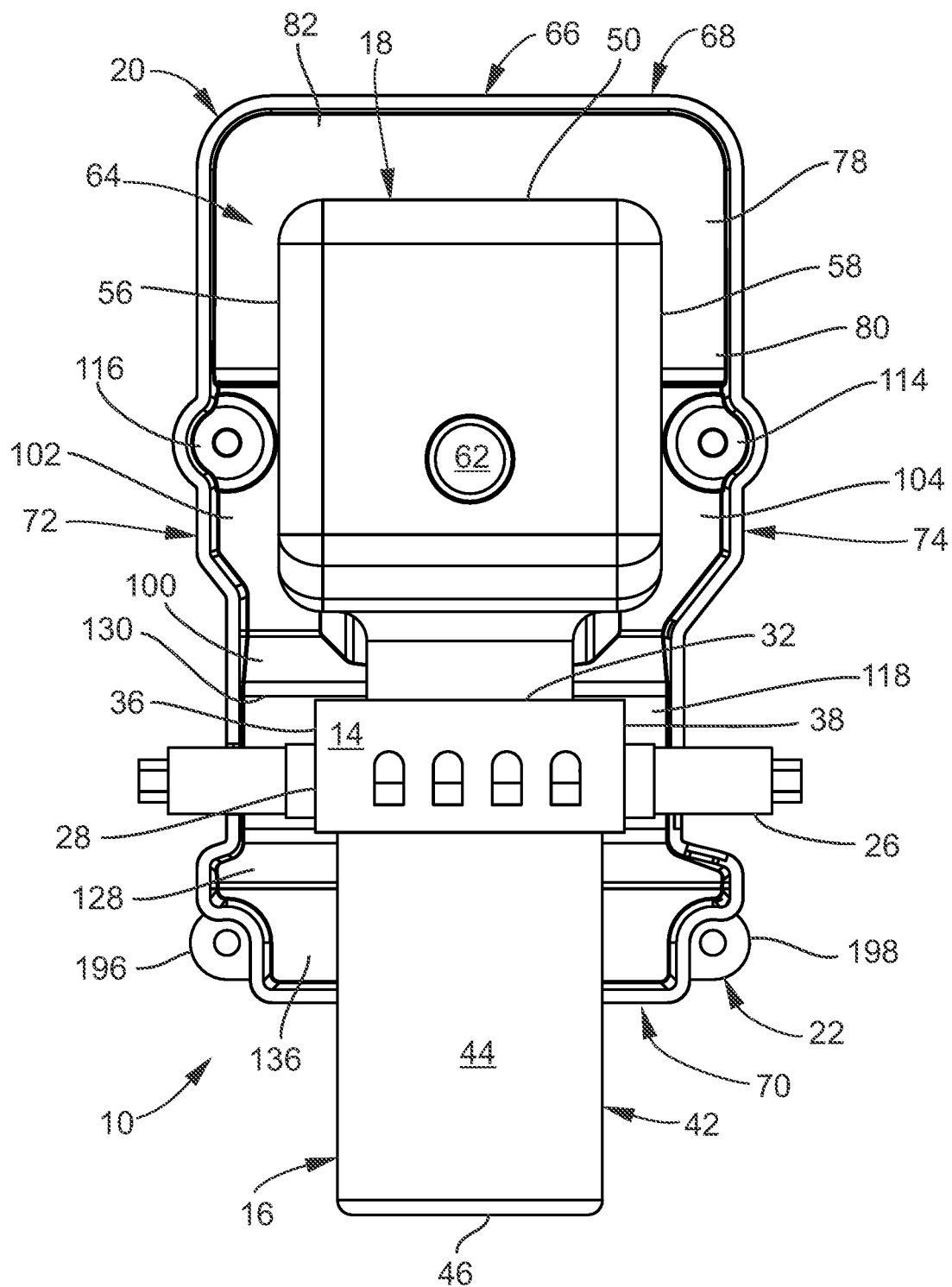
FIG. 4 is a top view of the hydraulic fluid assembly of FIG. 3.

FIG. 4 shows a bird's eye view of hydraulic fluid assembly 10 and shows the size of hydraulic fluid spill over receptacle 20 relative to the main body 28 of the hydraulic pump 14, relative to the hydraulic fluid reservoir 18, and relative to the main housing 42 of the electric motor 16. FIG. 4 shows that the hydraulic fluid spill over receptacle 20 is underneath an entirety of the main body 28 of the hydraulic pump 14, is further underneath an entirety of the hydraulic fluid reservoir 18, and is further underneath of at least a portion of the main housing 42 of the electric motor 16. FIG. 4 further shows that a great amount of the inside peripheral portion of the floor 62 of the hydraulic fluid spill over receptacle 20 is accessible for wiping up hydraulic fluid spill over.

Figure 5:
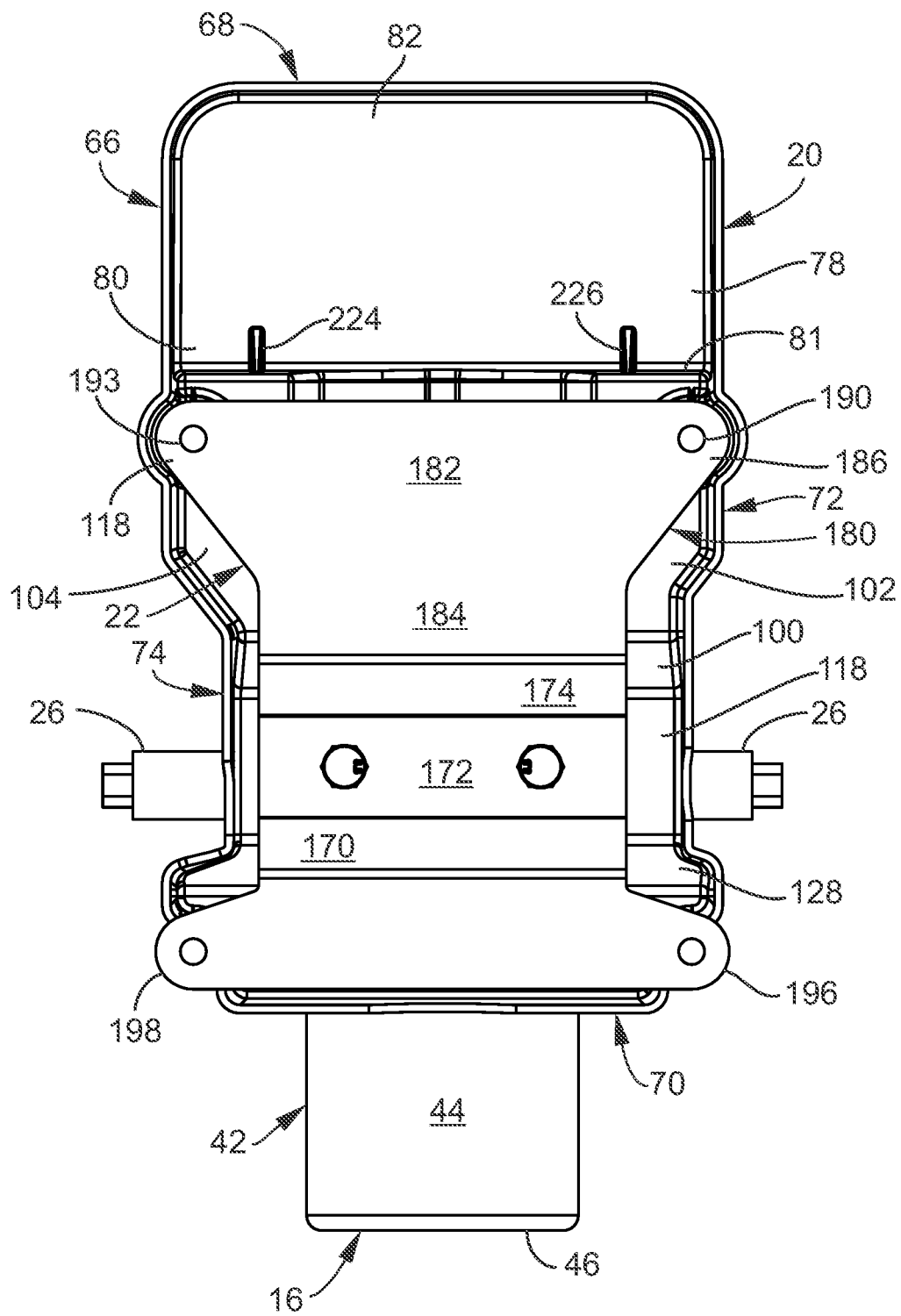
FIG. 5 is a bottom view of the hydraulic fluid assembly of FIG. 3.

FIG. 5 shows that the only portions of the hydraulic fluid assembly 10 that extend beyond the endless peripheral wall 66 are portions of the control and pressure relief valves 26 and a portion of the main housing 42 of the electric motor 16. FIG. 5 further shows that the hydraulic fluid spill over receptacle 20 is supported by a pair of braces 226, 224 that respectively extend from inner wall sections 81A, 81B to first floor portion 78. Braces 224, 226 may be triangular in shape and integral with the hydraulic fluid spill over receptacle 20.

Figure 6A:
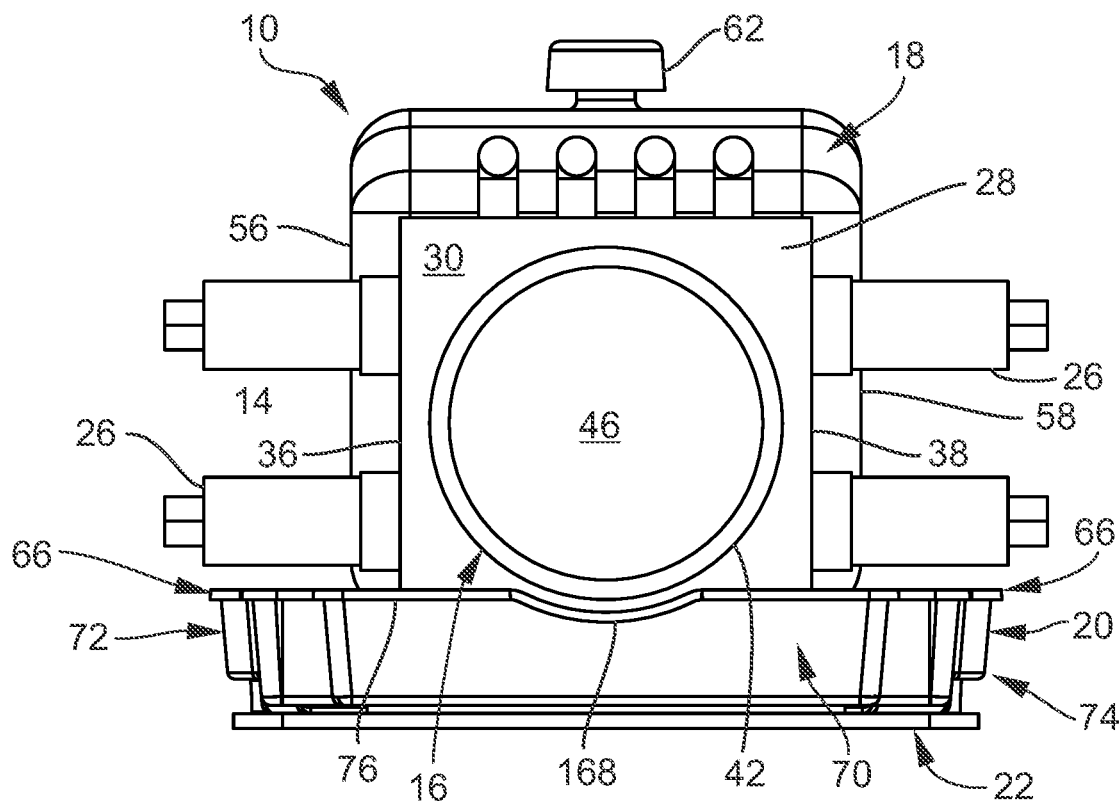
FIG. 6A is a front view of the hydraulic fluid assembly of FIG. 3.

FIG. 6A shows a front view of the hydraulic fluid assembly 10 and further shows that the main body 28 of the hydraulic pump 14 depends into the hydraulic fluid spill over receptacle 20, i.e., below the elevation of a plane defined by straight portions of top edge 76 of front end wall 70 and straight portions of top edge 76 of rear end wall 68. FIG. 6A further shows that reservoir 18 depends into the hydraulic fluid spill over receptacle 20, i.e., below the elevation of a plane defined by straight portions of top edge 76 of front end wall 70 and straight portions of top edge 76 of rear end wall 68. FIG. 6A further shows that the main housing 42 of the electric motor 16 is adjacent to and spaced from cut-out 168 of the front end wall 70.

Figure 6B:
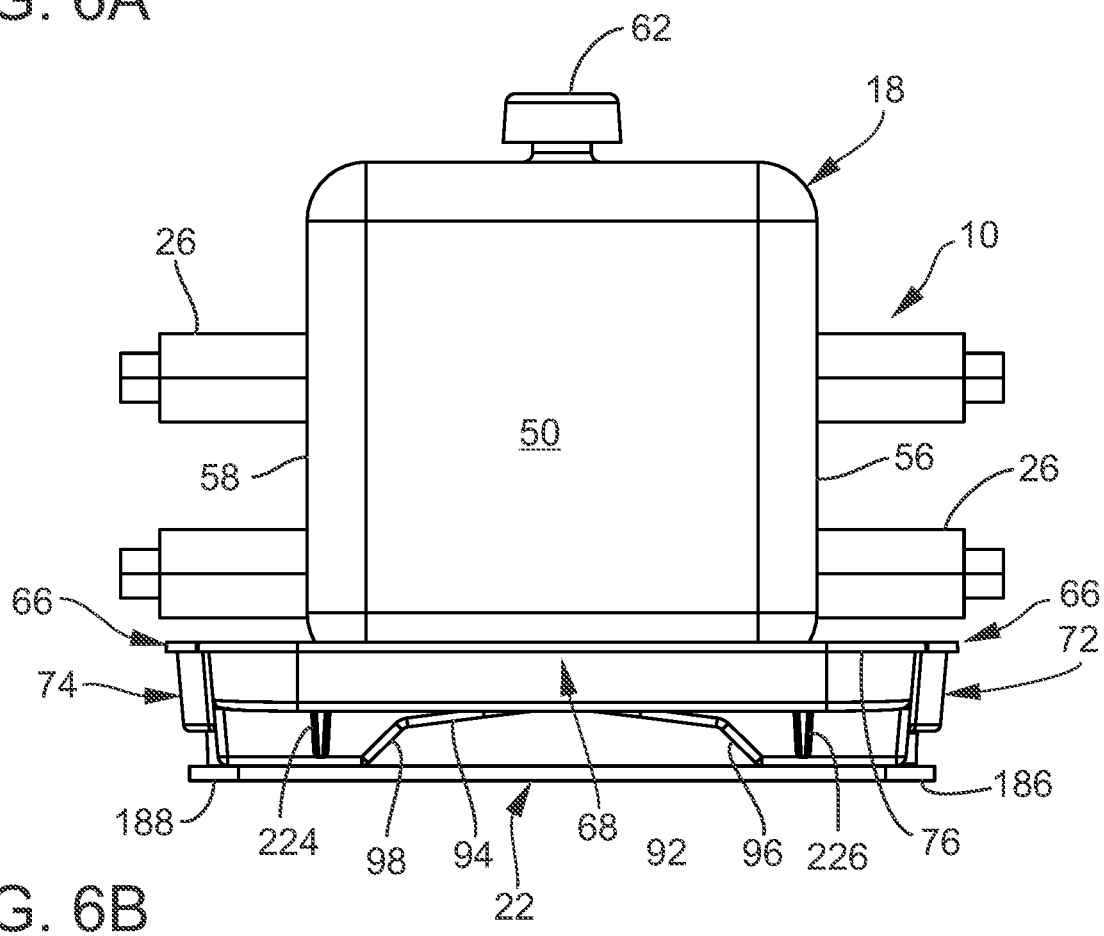
FIG. 6B is a rear view of the hydraulic fluid assembly of FIG. 3.

FIG. 6B shows a rear view of the hydraulic fluid assembly 10 and further shows that the reservoir 18 depends into the hydraulic fluid spill over receptacle 20, i.e., below the elevation of a plane defined by straight portions of top edge 76 of front end wall 70 and straight portions of top edge 76 of rear end wall 68.

Figure 7:
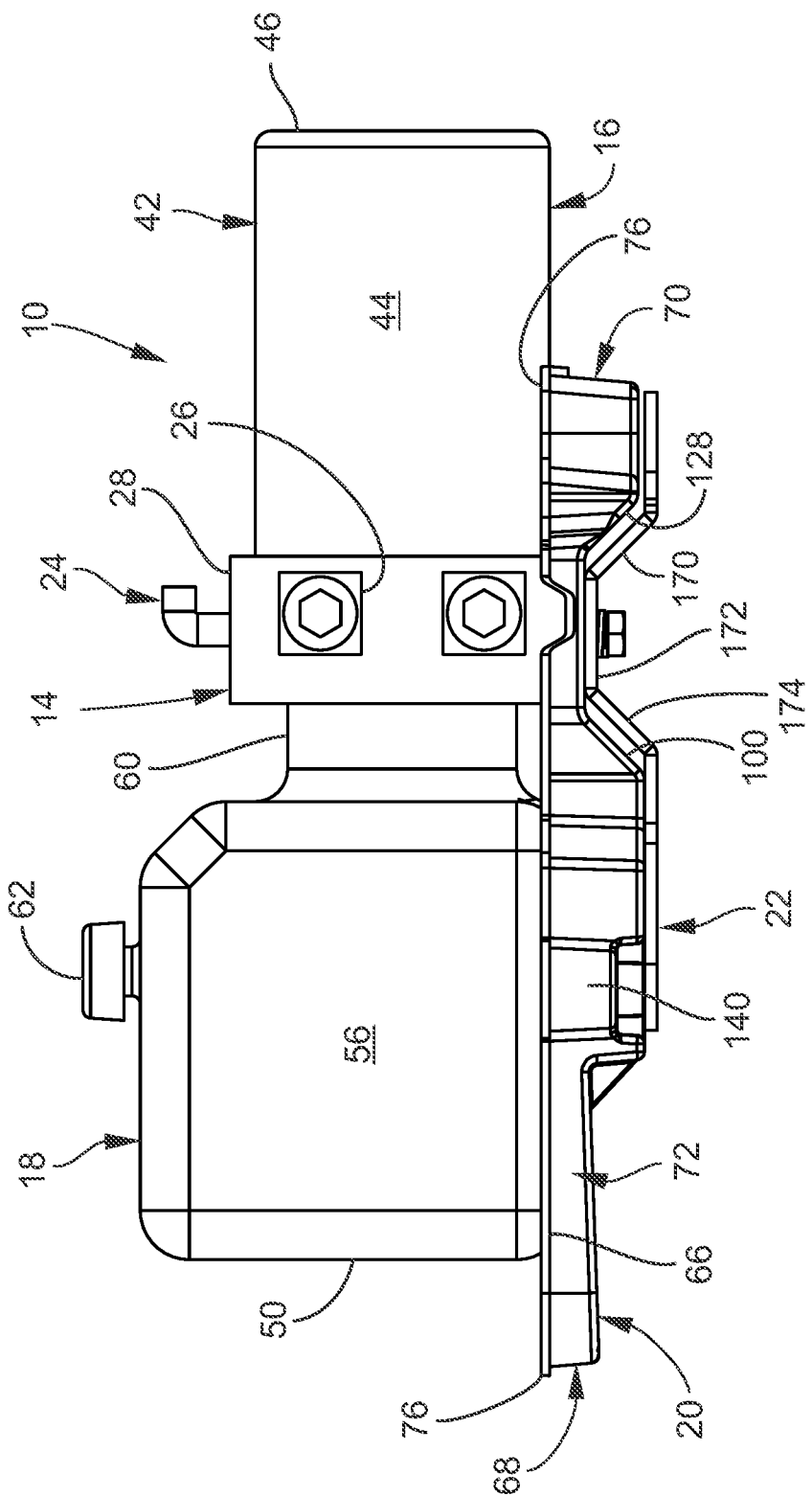
FIG. 7 is a right hand side view of the hydraulic fluid assembly of FIG. 3.

FIG. 7 shows a side view of the hydraulic fluid assembly 10 and further shows that the main body 28 of the hydraulic pump 14 depends into the hydraulic fluid spill over receptacle 20, i.e., below the elevation of a plane defined by straight portions of top edge 76 of front end wall 70 and straight portions of top edge 76 of rear end wall 68. FIG. 7 further shows that reservoir 18 depends into the hydraulic fluid spill over receptacle 20, i.e., below the elevation of a plane defined by straight portions of top edge 76 of front end wall 70 and straight portions of top edge 76 of rear end wall 68. FIG. 7 further shows that a portion of the main housing 42 of the electric motor 16 depends into the hydraulic fluid spill over receptacle i.e., below the elevation of a plane defined by straight portions of top edge 76 of front end wall 70 and straight portions of top edge 76 of rear end wall 68.

Figure 8:
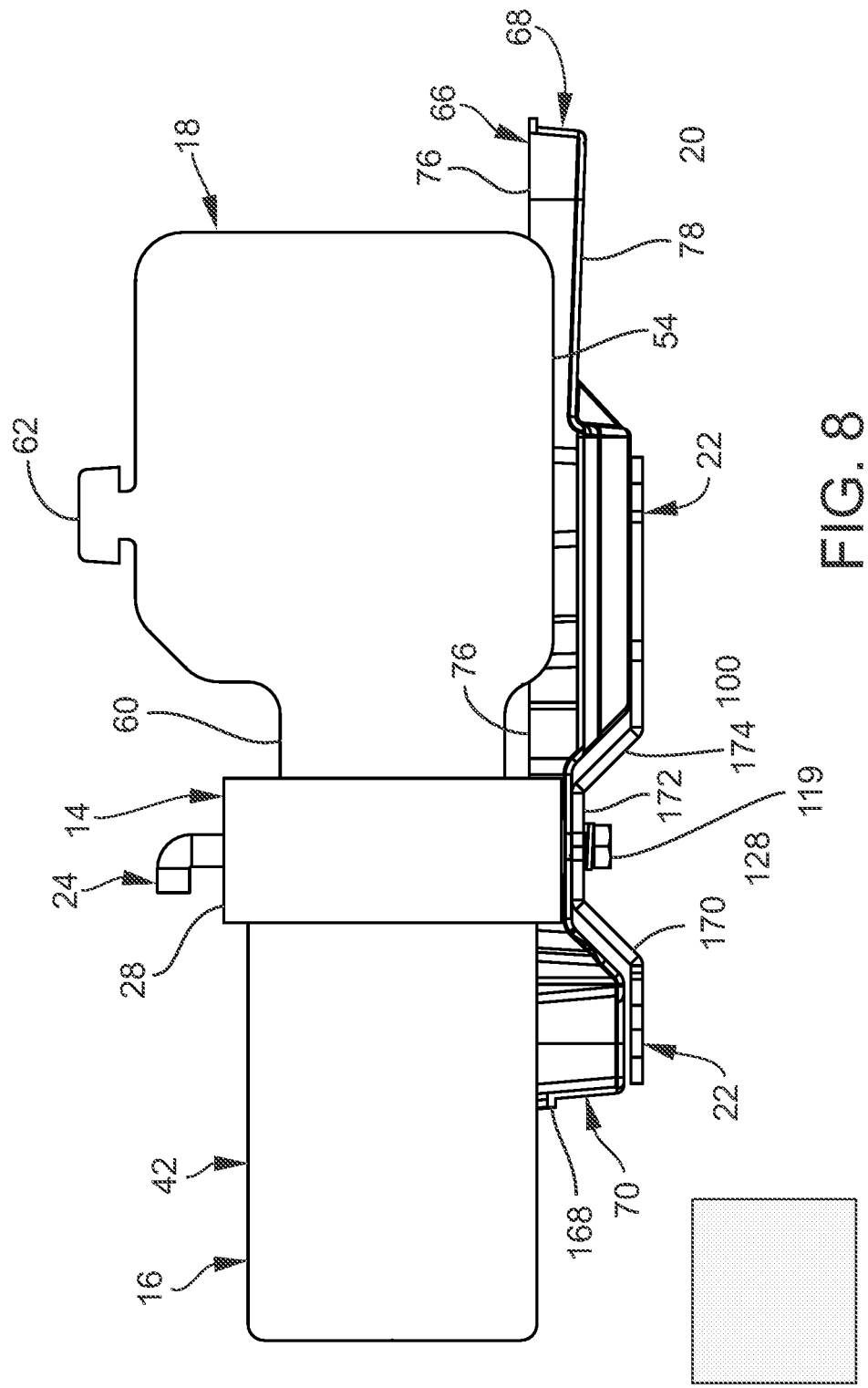
FIG. 8 is a diagrammatic left hand side view of the hydraulic fluid assembly of FIG. 3 showing the hydraulic fluid spill over receptacle and mount in section and diagrammatically showing the electric motor, hydraulic pump, and hydraulic fluid reservoir.

FIG. 8 shows a diagrammatic view of the hydraulic fluid assembly 10 and further shows that the main body 28 of the hydraulic pump 14 depends into the hydraulic fluid spill over receptacle 20, i.e., below the elevation of a plane defined by straight portions of top edge 76 of front end wall 70 and straight portions of top edge 76 of rear end wall 68. FIG. 7 further shows that reservoir 18 depends into the hydraulic fluid spill over receptacle 20, i.e., below the elevation of a plane defined by straight portions of top edge 76 of front end wall 70 and straight portions of top edge 76 of rear end wall 68. FIG. 7 further shows that a portion of the main housing 42 of the electric motor 16 depends into the hydraulic fluid spill over receptacle i.e., below the elevation of a plane defined by straight portions of top edge 76 of front end wall 70 and straight portions of top edge 76 of rear end wall 68.

FIG. 9 shows an isolated perspective view of the hydraulic fluid spill over receptacle 20 and has been described in detail above.

FIG. 10 shows an isolated perspective view of the mount and has been described in detail above.

FIGS. 11A and 11B show top and bottom isolated views of the hydraulic fluid spill over receptacle 20 and provide additional information. For example, the flat bottom surface 136 of the third floor portion 134 is shown in each of FIGS. 11A and 11B. Also, the entireties of pocket floor portions 102, 104 are shown in FIGS. 11A and 11B. Further, oblique or tapering inner wall 100 is shown in FIGS. 11A and 11B. Still further, pin connector holes 110, 112, 120, and 122 are shown in FIGS. 11A and 11B. Also, tapering walls 96, 98 are shown in FIGS. 11A and 11B.

Figure 12A:
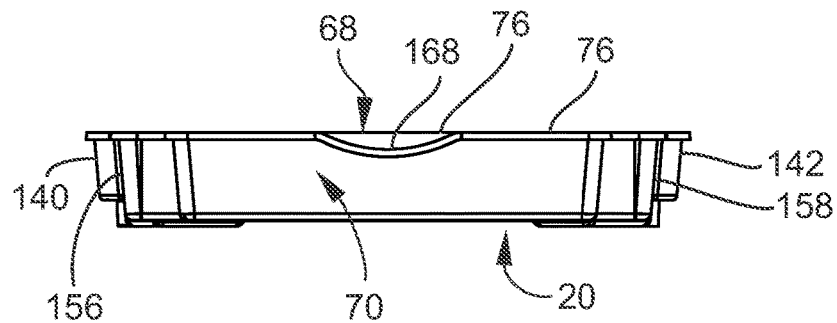
FIG. 12A is a front view of the hydraulic fluid spill over receptacle of FIG. 9.

FIG. 12A shows a head on or front view of the hydraulic fluid spill over receptacle 20. FIG. 12A shows the relative width of U-shaped portions 140 and 156 of the endless wall 66 and U-shaped portions 142 and 158. Further, FIG. 12A shows that a straight portion of top edge 76 of rear wall 68 and a straight portion of the top edge 76 of front wall 70 define a plane.

Figure 12B:
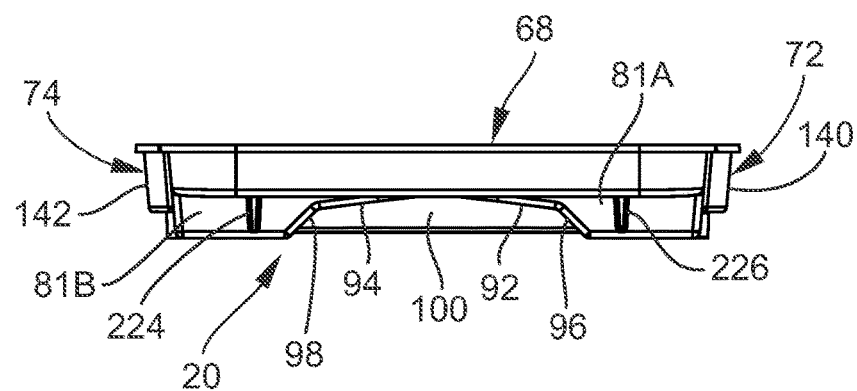
FIG. 12B is a rear view of the hydraulic fluid drip tray of FIG. 9.
Figure 12C:
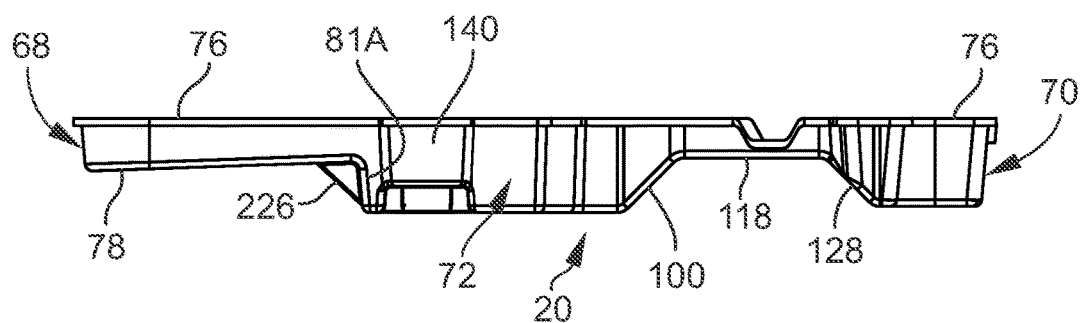
FIG. 12C is a right hand side view of the hydraulic fluid drip tray of FIG. 9.

FIG. 12B shows a rear view of the hydraulic fluid spill over receptacle 20 and shows the inner wall sections 81A, 81B, the tapering floor portions 94 and 98, and the tapering floor portions 92 and 96. FIG. 12B further shows the tapering inner wall 100.

FIG. 12C is a right hand side view of the hydraulic fluid spill over receptacle 20 and shows the slope or obliqueness of the first floor portion 78 such that hydraulic fluid spill over runs to the periphery of the floor 64 adjacent to rear end wall 68. FIG. 12C further shows the underspace provided by tapering walls 100, 128, and floor portion 118 so as to make accessible pin connector openings 120, 122 for engaging pin connectors. FIG. 12C further shows the plane defined by straight portions of the endless top edge 76. Hydraulic reservoir 18 and the main body 28 of the hydraulic pump 14 depend into the hydraulic fluid spill over receptacle 20 below such plane.

Figure 12D:
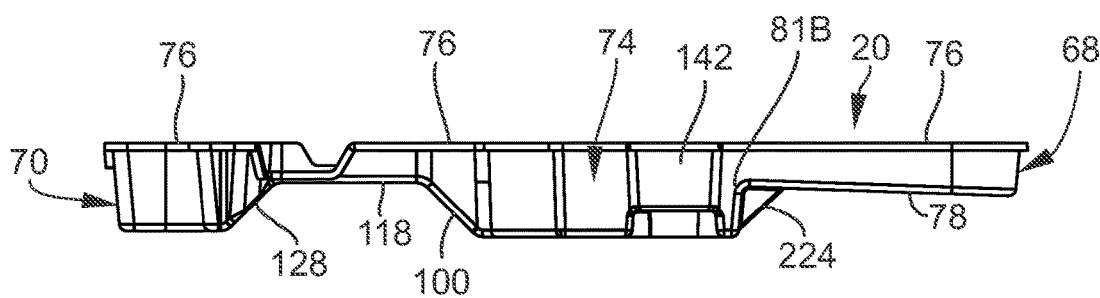
FIG. 12D is a left hand side view of the hydraulic fluid drip tray of FIG. 9.

FIG. 12D is a left hand side view of the hydraulic fluid spill over receptacle 20 and shows the slope or obliqueness of the first floor portion 78 such that hydraulic fluid spill over runs to the periphery of the floor 64 adjacent to rear end wall 68. FIG. 12D further shows the underspace provided by tapering walls 100, 128, and floor portion 118 so as to make accessible pin connector openings 120, 122 for engaging pin connectors. FIG. 12D further shows the plane defined by straight portions of the endless top edge 76. Hydraulic reservoir 18 and the main body 28 of the hydraulic pump 14 depend into the hydraulic fluid spill over receptacle 20 below such plane.

Figure 13A:
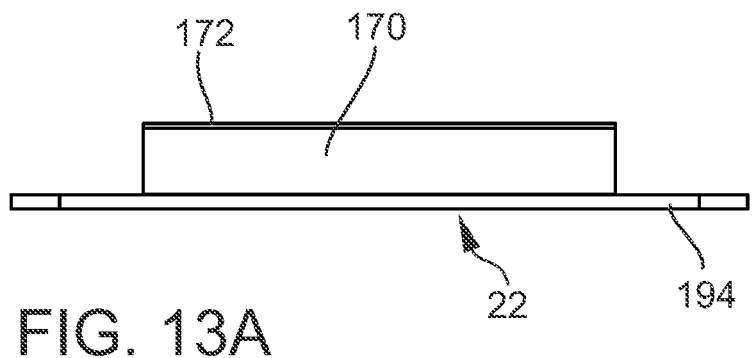
FIG. 13A is a front view of the mount of FIG. 10.

FIG. 13A shows that plate section 194 and plate section 180 define a plane and further shows that edges of plate section 170 are disposed at a right angle to such plane. FIG. 13A further shows that plate section 172 extends parallel to such plane.

Figure 13B:
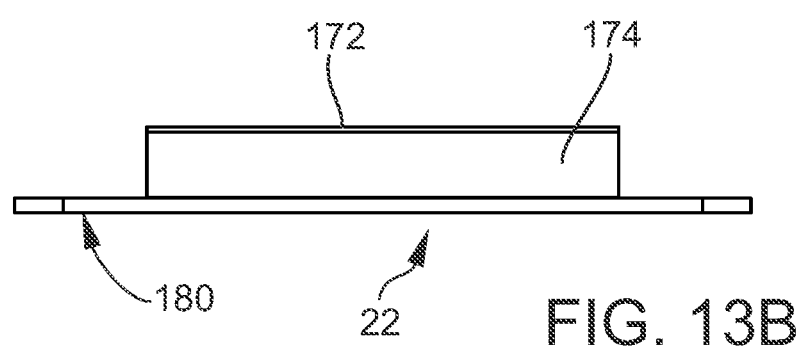
FIG. 13B is a rear view of the mount tray of FIG.

FIG. 13B shows that plate section 194 and plate section 180 define a plane and further shows that edges of plate section 174 are disposed at a right angle to such plane. FIG. 13B further shows that plate section 172 extends parallel to such plane.

Figure 13C:
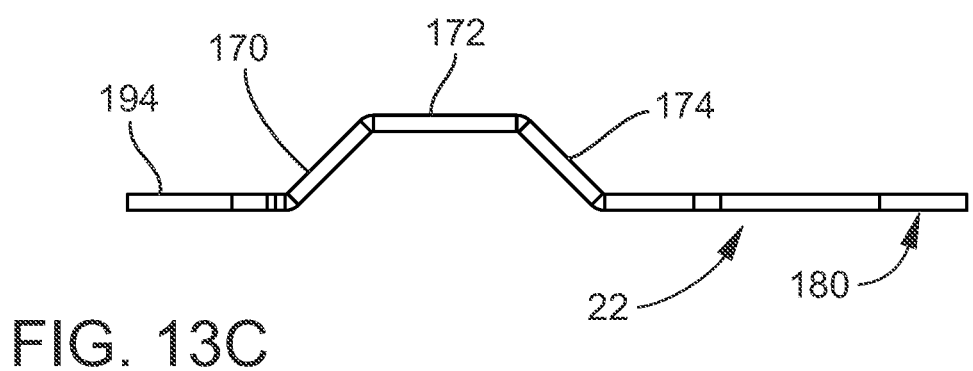
FIG. 13C is a left hand side view of the mount of FIG. 10.

FIG. 13C shows that plate section 194 and plate section 180 define a plane, that plate section 172 extends parallel to such plane, and that plate sections 170, 174 are disposed obliquely to such plane.

Figure 13D:
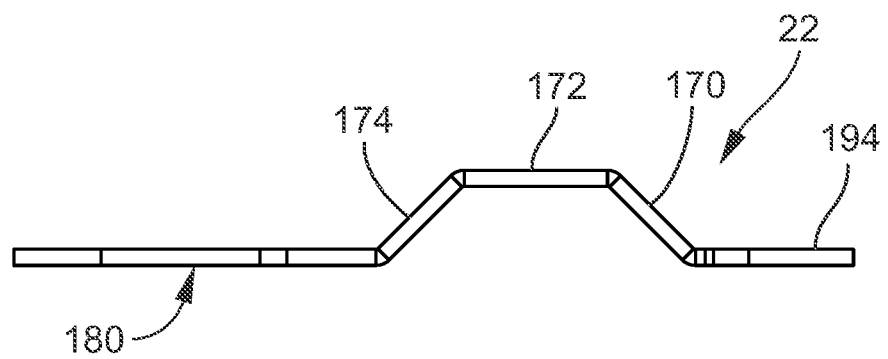
FIG. 13D is a right hand side view of the mount of FIG. 10.

FIG. 13D shows that plate section 194 and plate section 180 define a plane, that plate section 172 extends parallel to such plane, and that plate sections 170, 174 are disposed obliquely to such plane.

Figure 14A:
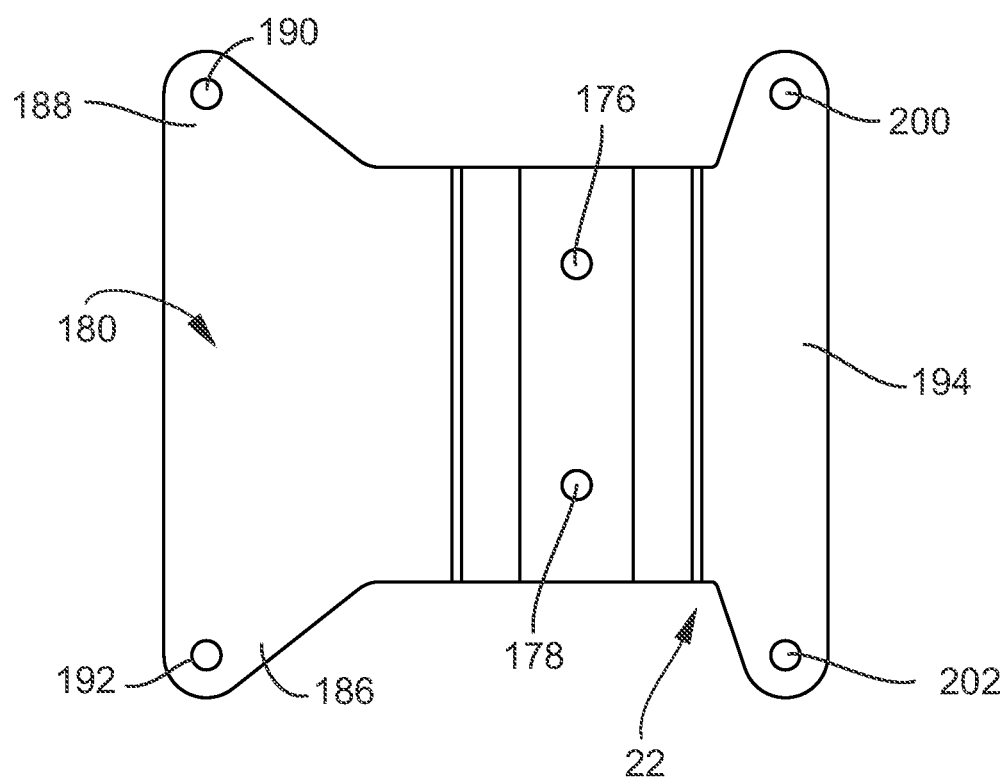
FIG. 14A is a bottom view of the mount of FIG. 10.

FIG. 14A is a bottom view of the mount 22. FIG. 14A shows that the distance between the axis of openings 190, 192 is equal to the distance between the axis of openings 200, 202. FIG. 14A shows that plate section 180 includes a dovetail portion, that plate section 194 is generally dovetail shaped, and that mount 22 includes straight edges between such dovetail shaped portions.

Figure 14B:
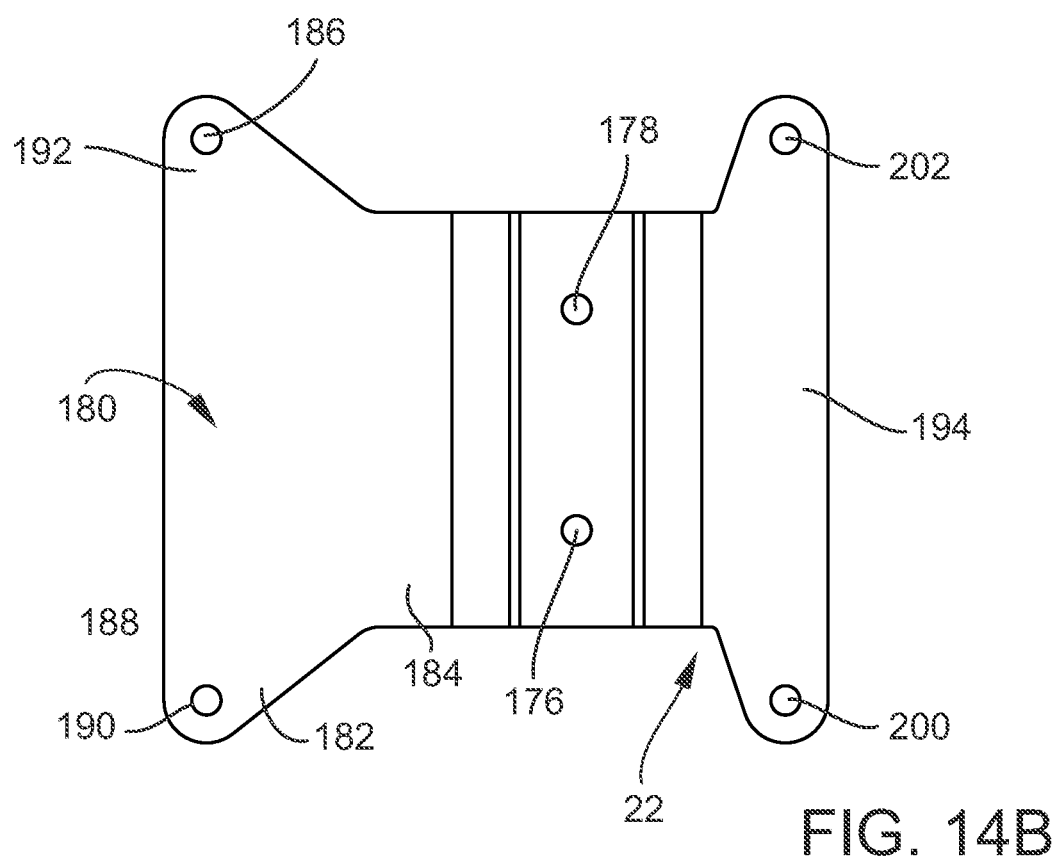
FIG. 14B is a top view of the mount of FIG. 10.

FIG. 14B is a top view of the mount 22. FIG. 14B shows that the distance between the axis of openings 190, 192 is equal to the distance between the axis of openings 200, 202. FIG. 14B shows that plate section 180 includes a dovetail portion, that plate section 194 is generally dovetail shaped, and that mount 22 includes straight edges between such dovetail shaped portions.

In operation, it can be first noted that the unit combination of the hydraulic pump 14, electric motor 16, and hydraulic reservoir 18 is self-supporting. In other words, relative to a surface, such combination is supported on such surface by the main housing 28 of the hydraulic pump 14. Thus, a first step can be the engagement of the hydraulic fluid spill over receptacle 20 to the main housing 28 of the hydraulic pump 14 by pin connectors 119 that engage pin holes 120, 122 in the second floor portion 118. Then the hydraulic fluid spill over receptacle 20 may be engaged to the floor of, for example, a pontoon boat, with pin connectors like pin connectors 119, 216, or 218 that engage pin holes 110, 112 formed in the intermediate floor portion 86 and that further engage the floor of the pontoon boat. Optionally, mount 22 may be utilized. In such a case where the mount 22 is used, the mount 22 may be engaged to the hydraulic fluid spill over receptacle 20 either before or after the hydraulic fluid spill over receptacle 20 is engaged to the main housing 28 of the hydraulic pump 14 and then, subsequently, the combination of the hydraulic pump 14, electric motor 16, hydraulic fluid reservoir 18, hydraulic fluid spill over receptacle 20, mount 22 may be engaged to the floor of the pontoon boat by employing pin connectors engaging pin holes 200, 202 of the mount 22 and pin connectors engaging the holes 190, 192 of the mount 22 and holes 110, 112 of the hydraulic fluid spill over receptacle 20.

Alternatively, the receptacle 20 may first be pinned to the floor 214 of the pontoon boat 12 using pin holes 110, 112 and then the unit combination of the hydraulic pump 14, electric motor 16, and hydraulic reservoir 18 is engaged to the receptacle 20. Optionally, the combination of the mount 22 and receptacle 20 may first be pinned to the floor 214 of the pontoon boat 12 and then, subsequently, the unit combination of the hydraulic pump 14, electric motor 16, and hydraulic reservoir 18 is pinned to the receptacle 20 using pin connectors 119 that engage pin holes 120, 122 and that further engage pin connections on the bottom side 40 of the main housing 28 of the hydraulic pump 14.

In operation, to add hydraulic fluid to the hydraulic fluid reservoir 18, cap 62 is removed. Then hydraulic fluid is poured into the hydraulic fluid reservoir 18 directly through the opening left open by the cap 62. A funnel or hose may be used to direct hydraulic fluid into the hydraulic fluid reservoir 18 if desired. Regardless of the method used to fill the fluid reservoir 18, hydraulic fluid may spill out or splash out onto one or more surfaces of the hydraulic fluid reservoir 18, hydraulic pump 14, and/or electric motor 16. Then, such hydraulic fluid spill over or splash over runs down the surfaces of the reservoir 18, hydraulic pump 14, and/or electric motor 16 to drip down into the hydraulic fluid spill over receptacle 20. Then such hydraulic fluid spill over is directed by various floor portions of the receptacle 20 to be directed to peripheral floor portions adjacent to the endless wall 66 where the hydraulic fluid spill over is easily accessible and wiped up with a cloth rag.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A hydraulic fluid assembly comprising:
   a) a hydraulic pump, the hydraulic pump having a main body, the main body having at least one fluid outlet and at least one fluid inlet;
   b) an electric motor engaged to the hydraulic pump for driving the pump, the electric motor having a main housing;
   c) a hydraulic fluid reservoir engaged to the hydraulic pump for feeding hydraulic fluid to the hydraulic pump and for receiving hydraulic fluid from the hydraulic pump;
   d) a hydraulic fluid spill over receptacle, the hydraulic fluid spill over receptacle being engaged to the main body of the hydraulic pump, the hydraulic fluid spill over receptacle being underneath at least a portion of the main housing of the electric motor, underneath an entirety of the main body of the hydraulic pump, and underneath an entirety of the hydraulic fluid reservoir; and
   e) wherein the hydraulic fluid spill over receptacle includes a first end floor portion, the first end floor portion having an inner end section directly underneath the hydraulic fluid reservoir and an outer end section extending beyond an end of the hydraulic fluid reservoir such that no portion of the hydraulic fluid reservoir extends over the outer end section, the outer end section being disposed at an altitude lower than the inner end section such that hydraulic fluid runs downhill from the inner end section to the outer end section.

2. The hydraulic fluid assembly of claim 1, wherein the hydraulic fluid spill over receptacle includes a first floor portion, at least a portion of the first floor portion being directly underneath at least a portion of the hydraulic fluid reservoir, the first floor portion having an uppermost surface spaced from a bottom of the hydraulic fluid reservoir such that an entirety of the first floor portion is spaced from the hydraulic fluid reservoir.

3. The hydraulic fluid assembly of claim 1, wherein the hydraulic fluid spill over receptacle includes a second floor portion, at least a portion of the second floor portion being directly underneath at least a portion of the main body of the hydraulic pump, the second floor portion being engaged to the main body of the hydraulic pump.

4. The hydraulic fluid assembly of claim 1, wherein the hydraulic fluid spill over receptacle includes a third floor portion, at least a portion of the third floor portion being directly underneath at least a portion of the main housing of the electric motor, the third floor portion having an uppermost surface spaced from the main body of the electric motor such that an entirety of the third floor portion is spaced from the main housing of the electric motor.

5. The hydraulic fluid assembly of claim 1, wherein the hydraulic fluid spill over receptacle includes a pair of first opposing sidewall sections having respective first top edge sections, the hydraulic fluid reservoir intermediate the first sidewall sections, the first top edge sections being at a greater altitude than a bottom of the hydraulic fluid reservoir.

6. The hydraulic fluid assembly of claim 1, wherein the hydraulic fluid spill over receptacle includes a pair of second opposing sidewall sections having respective second top edge sections, the main body of the hydraulic pump intermediate the second sidewall sections, the second top edge sections being at a greater altitude than a bottom of the main body of the hydraulic pump.

7. The hydraulic fluid assembly of claim 1, wherein the hydraulic fluid spill over receptacle includes a pair of third opposing sidewall sections having respective third top edge sections, the main housing of the electric motor intermediate the third sidewall sections, the third top edge sections being at a greater altitude than a bottom of the main housing of the electric motor.

8. The hydraulic fluid assembly of claim 1, wherein the hydraulic fluid spill over receptacle includes first, second, and third bottom sections, the first bottom section being offset vertically and horizontally from an underside of the main body of the hydraulic pump, the second bottom section being directly underneath the underside of the main body of the hydraulic pump, the third surface bottom section being offset vertically and horizontally from the underside of the main body of the hydraulic pump, wherein the second bottom section is elevated relative to the first and third bottom sections to space the second bottom section from a surface on which the hydraulic fluid assembly is mounted.

9. The hydraulic fluid assembly of claim 1, wherein the inner end section and outer end section are obliquely disposed such that hydraulic fluid on the inner end section and outer end section runs downhill from the inner end section to the outer end section and to an end wall extending upwardly from the outer end section.

10. The hydraulic fluid assembly of claim 1, wherein the hydraulic fluid spill over receptacle includes an intermediate floor portion, the intermediate floor portion being adjacent to at least a portion of the hydraulic fluid reservoir, the intermediate floor portion having a raised middle section with first and second surfaces tapering outwardly and downwardly away from each other, the first surface tapering into a first pocket, the second surface tapering into a second pocket, the first pocket disposed adjacent to a first sidewall section, the second pocket disposed adjacent to a second sidewall section opposing the first sidewall section, whereby hydraulic fluid runs from the raised middle section to the first and second pockets to be adjacent to the first and second sidewall sections.

11. A hydraulic fluid spill over receptacle for collecting excess hydraulic fluid dripping from a hydraulic fluid assembly, the hydraulic fluid assembly having a hydraulic pump, an electric motor driving the hydraulic pump, and a hydraulic fluid receptacle engaged to the hydraulic pump, the hydraulic fluid receptacle comprising:
 a) a floor;
 b) an endless peripheral wall, the endless peripheral wall extending upwardly from the floor, the endless peripheral wall having a pair of first and second sidewalls and a pair of first and second end walls between the sidewalls;
 c) the floor having a first end floor portion, at least a portion of the first end floor portion disposed directly underneath at least a portion of the hydraulic fluid reservoir, the first end floor portion being defined in part by the first end wall and first and second sidewalls, the first end floor portion having an uppermost surface spaced from a bottom of the hydraulic fluid reservoir, the uppermost surface extending transversely of the first and second sidewalls, the first end floor portion tapering downwardly from the uppermost surface of the first end floor portion to the first end wall;
 d) the floor having an intermediate floor portion, at least a portion of the intermediate floor portion disposed directly underneath at least a portion of the hydraulic fluid reservoir, the intermediate floor portion having an uppermost surface spaced from a bottom of the hydraulic fluid reservoir, the intermediate floor portion tapering downwardly from the uppermost surface of the intermediate floor portion to a first pocket defined in part by the first sidewall, the intermediate floor portion tapering downwardly from the uppermost surface of the intermediate floor portion to a second pocket defined in part by the second sidewall;
 e) the floor having an elevated portion extending between the first and second sidewalls, the elevated portion being spaced from a plane defined by bottom portions of the hydraulic fluid receptacle that are adjacent to a surface on which the hydraulic fluid receptacle rests, the elevated portion capable of being engaged to the hydraulic pump; and
 f) the floor having a second end floor portion, at least a portion of the second end floor portion being disposed directly underneath at least a portion of the electric motor, the second end floor portion being defined in part by the second end wall and first and second sidewalls.

12. A receptacle comprising:
 a) a floor;
 b) an endless peripheral wall, the endless peripheral wall extending upwardly from the floor, the endless peripheral wall having a pair of first and second sidewalls and a pair of first and second end walls between the sidewalls;
 c) the floor having a first end floor portion, the first end floor portion being defined in part by the first end wall and first and second sidewalls, the first end floor portion having an uppermost surface, the uppermost surface extending transversely of the first and second sidewalls, the first end floor portion tapering downwardly from the uppermost surface of the end floor portion to the first end wall;
 d) the floor having an intermediate floor portion, the intermediate floor portion having an uppermost surface, the uppermost surface extending transversely of the first and second end walls, the intermediate floor portion tapering downwardly from the uppermost surface of the intermediate floor portion to a first pocket defined in part by the first sidewall, the intermediate floor portion tapering downwardly from the uppermost surface of the intermediate floor portion to a second pocket defined in part by the second sidewall;
 e) the floor having an elevated floor portion extending between the first and second sidewalls, the elevated floor portion being spaced from a plane defined by bottom portions of the hydraulic fluid receptacle that are adjacent to a surface on which the hydraulic fluid receptacle rests;
 f) the floor having a second end floor portion, the second end floor portion being defined in part by the second end wall and first and second sidewalls; and
 g) the second end floor portion being adjacent to the elevated floor portion, the elevated floor portion being adjacent to the intermediate floor portion, the intermediate floor portion being adjacent to the first end floor portion.

13. The receptacle of claim 12, wherein the first pocket includes a first pocket floor portion and wherein the second pocket includes a second pocket floor portion, the first and second pocket floor portions being disposed at an altitude less than a lowermost portion of the first end floor portion.

14. The receptacle of claim 12, wherein the second end floor portion is disposed at an altitude less than a lowermost portion of the first end floor portion.

15. The receptacle of claim 12, wherein the elevated floor portion includes an opening whereby the receptacle may be engaged to an object by a pin connector.

16. The receptacle of claim 12, wherein each of the first and second pockets includes respective first and second openings whereby the receptacle may be engaged to a second object by respective first and second pin connectors.

17. The receptacle of claim 12, wherein the uppermost surface portion of the intermediate floor portion is disposed equidistance from the first and second sidewalls.

18. A hydraulic fluid assembly comprising:
 a) a hydraulic pump, the hydraulic pump having a main body, the main body having at least one fluid outlet and at least one fluid inlet;
 b) an electric motor engaged to the hydraulic pump for driving the pump, the electric motor having a main housing;
 c) a hydraulic fluid reservoir engaged to the hydraulic pump for feeding hydraulic fluid to the hydraulic pump and for receiving hydraulic fluid from the hydraulic pump;
 d) a hydraulic fluid spill over receptacle, the hydraulic fluid spill over receptacle being engaged to the main body of the hydraulic pump, the hydraulic fluid spill over receptacle being underneath at least a portion of the main housing of the electric motor, underneath an entirety of the main body of the hydraulic pump, and underneath an entirety of the hydraulic fluid reservoir; and
 e) wherein the hydraulic fluid spill over receptacle includes an intermediate floor portion, the intermediate floor portion being adjacent to at least a portion of the hydraulic fluid reservoir, the intermediate floor portion having a raised middle section with first and second surfaces tapering outwardly and downwardly away from each other, the first surface tapering into a first pocket, the second surface tapering into a second pocket, the first pocket disposed adjacent to a first sidewall section, the second pocket disposed adjacent to a second sidewall section opposing the first sidewall section, whereby hydraulic fluid runs from the raised middle section to the first and second pockets to be adjacent to the first and second sidewall sections.

\* \* \* \* \*